(12) United States Patent
Mangum et al.

(10) Patent No.: US 11,498,630 B2
(45) Date of Patent: Nov. 15, 2022

(54) SNOW VEHICLE

(71) Applicant: Polaris Industries Inc., Medina, MN (US)

(72) Inventors: Allen M. Mangum, Sandpoint, ID (US); Cody L. Telford, Sandpoint, ID (US); Justin R. York, Cocalalla, ID (US); Phillip M. Driggars, Sandpoint, ID (US)

(73) Assignee: Polaris Industries Inc., Medina, MN (US)

( * ) Notice: Subject to any disclaimer, the term of this patent is extended or adjusted under 35 U.S.C. 154(b) by 33 days.

(21) Appl. No.: 17/115,259

(22) Filed: Dec. 8, 2020

(65) Prior Publication Data

US 2021/0086849 A1 Mar. 25, 2021

Related U.S. Application Data

(62) Division of application No. 15/449,467, filed on Mar. 3, 2017, now Pat. No. 10,889,338.

(51) Int. Cl.
*B62D 55/07* (2006.01)
*B62M 27/02* (2006.01)
*B62K 13/08* (2006.01)

(52) U.S. Cl.
CPC ............ *B62D 55/07* (2013.01); *B62K 13/08* (2013.01); *B62M 27/02* (2013.01); *B62M 2027/021* (2013.01); *B62M 2027/022* (2013.01); *B62M 2027/025* (2013.01); *B62M 2027/026* (2013.01); *B62M 2027/027* (2013.01)

(58) Field of Classification Search
CPC .. B62D 55/07; B62D 27/02; B62D 2027/021; B62D 2027/022
See application file for complete search history.

(56) References Cited

U.S. PATENT DOCUMENTS

| | | | |
|---|---|---|---|
| 3,336,994 | A | 8/1967 | Pederson |
| 3,527,505 | A | 9/1970 | Hetteen |
| 3,545,821 | A | 12/1970 | Erickson |
| 3,630,301 | A | 12/1971 | Henricks |
| 3,705,749 | A | 12/1972 | Harvey |

(Continued)

FOREIGN PATENT DOCUMENTS

| | | |
|---|---|---|
| AT | 242150 T | 6/2003 |
| CA | 2321860 A1 | 9/1999 |

(Continued)

OTHER PUBLICATIONS

"All Skis are not created equal", Web Page, <http://amsnow.com/how-to-tech/2005/09/all-skis-are-not-created-equal> Nov. 2005; 3 pages.

(Continued)

*Primary Examiner* — Kevin Hurley
(74) *Attorney, Agent, or Firm* — Faegre Drinker Biddle & Reath LLP

(57) ABSTRACT

A snow vehicle is disclosed comprising a vehicle frame, a propulsion unit coupled to the frame, and a front ski steered by a steering mechanism. The snow vehicle has a chain coupling the sprocket of the propulsion unit and a chain tensioning device to take up the chain tension. The chain has a chain guide positioned below a lower run of the chain which directs the chain towards an upper run of the chain.

12 Claims, 22 Drawing Sheets

(56) References Cited

U.S. PATENT DOCUMENTS

| | | |
|---|---|---|
| 3,718,341 A | 2/1973 | Westberg |
| 3,719,369 A | 3/1973 | Savage |
| 3,779,326 A | 12/1973 | Trautwein |
| 3,809,172 A | 5/1974 | Hendrickson et al. |
| 3,822,755 A | 7/1974 | Hine |
| 3,844,367 A | 10/1974 | Flohr |
| 3,857,578 A | 12/1974 | Alton |
| 3,872,938 A | 3/1975 | Degroot |
| RE28,423 E | 5/1975 | Higginbotham et al. |
| 3,931,861 A | 1/1976 | Olson |
| 3,933,214 A * | 1/1976 | Guibord ............... B62D 55/02 180/9.1 |
| 3,964,561 A | 6/1976 | Lunzer et al. |
| 3,977,485 A | 8/1976 | West et al. |
| 3,982,597 A | 9/1976 | Callaway |
| 4,034,820 A | 7/1977 | Barnhardt |
| 4,108,453 A | 8/1978 | Lavalier |
| 4,131,292 A | 12/1978 | Swech |
| 4,133,400 A | 1/1979 | Shiraishi |
| 4,244,436 A | 1/1981 | Condon et al. |
| 4,424,979 A | 1/1984 | Takagi |
| 4,434,867 A | 3/1984 | Grinde |
| 4,437,534 A | 3/1984 | Grinde |
| 4,442,913 A | 4/1984 | Grinde |
| 4,449,602 A | 5/1984 | Dittmann, Jr. |
| 4,502,560 A | 3/1985 | Hisatomi |
| 4,509,766 A | 4/1985 | Yasui et al. |
| 4,526,249 A | 7/1985 | Parker |
| 4,613,006 A | 9/1986 | Moss et al. |
| 4,768,794 A | 9/1988 | Bibollet |
| 4,804,198 A | 2/1989 | Imai et al. |
| 4,984,648 A | 1/1991 | Strzok |
| 5,064,208 A | 11/1991 | Bibollet |
| 5,145,195 A | 9/1992 | Campbell et al. |
| 5,145,201 A | 9/1992 | Metheny |
| 5,203,424 A | 4/1993 | Gogo et al. |
| 5,370,198 A | 12/1994 | Karpik |
| 5,474,146 A | 12/1995 | Yoshioka et al. |
| 5,586,614 A | 12/1996 | Kouchi et al. |
| 5,727,643 A | 3/1998 | Kawano et al. |
| 5,871,225 A | 2/1999 | Sutherland |
| 5,904,217 A | 5/1999 | Yamamoto et al. |
| 6,012,728 A | 1/2000 | Noble |
| 6,017,047 A | 1/2000 | Hoose |
| 6,095,275 A | 8/2000 | Shaw |
| 6,105,979 A | 8/2000 | Desrochers |
| 6,112,840 A | 9/2000 | Forbes |
| 6,234,263 B1 | 5/2001 | Boivin et al. |
| 6,283,254 B1 | 9/2001 | Bibollet |
| 6,302,232 B1 | 10/2001 | Forbes |
| 6,321,864 B1 | 11/2001 | Forbes |
| 6,382,338 B1 | 5/2002 | Forbes |
| 6,416,062 B1 | 7/2002 | Scatchard |
| 6,431,301 B1 | 8/2002 | Forbes |
| 6,446,744 B2 | 9/2002 | Wubbolts et al. |
| 6,505,896 B1 | 1/2003 | Boivin et al. |
| 6,511,079 B1 | 1/2003 | Charles, Sr. |
| 6,626,258 B1 | 9/2003 | Forbes |
| 6,626,441 B1 | 9/2003 | Hanson |
| 6,631,912 B2 | 10/2003 | Metheny |
| 6,663,117 B2 | 12/2003 | Cheney et al. |
| 6,736,414 B2 | 5/2004 | Farrally-Plourde |
| 6,783,133 B1 | 8/2004 | Araujo |
| 6,863,142 B2 | 3/2005 | Corbeil |
| 6,926,108 B1 | 8/2005 | Polakowski et al. |
| 7,017,695 B2 | 3/2006 | Meunier et al. |
| 7,090,229 B2 | 8/2006 | Monsrud et al. |
| 7,182,165 B1 | 2/2007 | Keinath et al. |
| 7,232,130 B2 | 6/2007 | Reeves |
| 7,322,581 B2 | 1/2008 | Leung |
| 7,353,898 B1 | 4/2008 | Bates, Jr. |
| 7,357,201 B2 | 4/2008 | Jordan |
| 7,475,751 B2 | 1/2009 | Pard et al. |
| 7,478,694 B2 | 1/2009 | Abe et al. |
| 7,481,437 B2 | 1/2009 | Musselman |
| 7,500,679 B2 | 3/2009 | Wade |
| 7,533,749 B1 | 5/2009 | Sampson et al. |
| 7,537,221 B2 | 5/2009 | Lasala |
| 7,540,506 B2 | 6/2009 | Cheney et al. |
| 7,594,557 B2 | 9/2009 | Polakowski et al. |
| D612,766 S | 3/2010 | Boivin |
| 7,694,768 B2 | 4/2010 | Giese et al. |
| 7,726,667 B2 | 6/2010 | Ferron |
| 7,745,751 B2 | 6/2010 | Takahashi et al. |
| 7,789,183 B2 | 9/2010 | Sadakuni et al. |
| 7,896,362 B1 | 3/2011 | Scatchard |
| 8,167,073 B2 | 5/2012 | Polakowski et al. |
| 8,403,342 B1 | 3/2013 | McDaniel |
| 8,418,792 B2 | 4/2013 | Rivard |
| 8,739,913 B2 | 6/2014 | Rivard |
| 8,910,738 B2 | 12/2014 | Mangum |
| 9,321,509 B2 | 4/2016 | Beavis |
| 9,731,746 B2 | 8/2017 | Hodgson et al. |
| 9,751,552 B2 | 9/2017 | Mangum et al. |
| 9,776,654 B2 | 10/2017 | Gentry |
| 9,873,485 B2 | 1/2018 | Mangum et al. |
| 9,988,067 B1 | 6/2018 | Mangum et al. |
| 10,202,169 B2 | 2/2019 | Mangum et al. |
| 10,232,910 B2 | 3/2019 | Mangum et al. |
| 10,479,448 B2 | 11/2019 | Tapio |
| 10,538,262 B2 | 1/2020 | Mangum et al. |
| 10,773,774 B2 | 9/2020 | Mangum et al. |
| 2002/0017765 A1 | 2/2002 | Mallette et al. |
| 2002/0041080 A1 | 4/2002 | Moriyama et al. |
| 2002/0140000 A1 | 10/2002 | Watanabe |
| 2002/0153186 A1 | 10/2002 | Lemieux |
| 2002/0158441 A1 | 10/2002 | Essinger |
| 2003/0024751 A1 | 2/2003 | Lebreux |
| 2003/0034191 A1 | 2/2003 | Karpik |
| 2003/0159868 A1 | 8/2003 | Alexander |
| 2004/0089193 A1 | 5/2004 | O'Donnell et al. |
| 2004/0124596 A1 | 7/2004 | Cheney et al. |
| 2004/0163857 A1 | 8/2004 | Corbeil |
| 2004/0195024 A1 | 10/2004 | Takahiko et al. |
| 2005/0017465 A1 | 1/2005 | Bergstrom |
| 2005/0183899 A1 | 8/2005 | Polakowski et al. |
| 2006/0232028 A1 | 10/2006 | Pard et al. |
| 2008/0017431 A1 | 1/2008 | Sadakuni et al. |
| 2008/0029324 A1 | 2/2008 | Plankenhorn |
| 2009/0230641 A1 | 9/2009 | Eugenio |
| 2009/0321167 A1 | 12/2009 | Simmons |
| 2011/0253468 A1 | 10/2011 | Rivard |
| 2011/0266077 A1 | 11/2011 | Nadeau |
| 2012/0205173 A1 | 8/2012 | Mallette et al. |
| 2012/0222908 A1 | 9/2012 | Mangum |
| 2012/0247852 A1 | 10/2012 | Fecteau et al. |
| 2013/0032417 A1 | 2/2013 | Sampson |
| 2013/0221628 A1 | 8/2013 | Rivard |
| 2013/0313794 A1 | 11/2013 | Bach et al. |
| 2014/0035255 A1 | 2/2014 | Erickson |
| 2015/0144412 A1 | 5/2015 | Mangum |
| 2015/0166143 A1 | 6/2015 | Beavis |
| 2015/0251727 A1 | 9/2015 | Thibault et al. |
| 2015/0259032 A1 | 9/2015 | Mangum |
| 2016/0031471 A1 | 2/2016 | Anderson et al. |
| 2016/0167722 A1 | 6/2016 | Anderson et al. |
| 2016/0280331 A1 | 9/2016 | Mangum |
| 2017/0066502 A1 | 3/2017 | Will et al. |
| 2017/0129570 A1 | 5/2017 | Mangum et al. |
| 2017/0259877 A1 | 9/2017 | Thompson et al. |
| 2018/0244326 A1 | 8/2018 | Zuchoski |
| 2018/0251168 A1 | 9/2018 | Mangum et al. |
| 2018/0257690 A1 | 9/2018 | Mangum et al. |
| 2018/0273142 A1 | 9/2018 | Mangum et al. |
| 2019/0084643 A1 | 3/2019 | Thompson et al. |
| 2019/0168844 A1 | 6/2019 | Mangum et al. |
| 2020/0140000 A1 | 5/2020 | Mangum et al. |
| 2021/0053653 A1 | 2/2021 | Mangum et al. |
| 2021/0129943 A1 | 5/2021 | Mangum |

FOREIGN PATENT DOCUMENTS

| | | |
|---|---|---|
| CA | 2555039 | 9/1999 |
| CA | 2555108 | 9/1999 |

(56) References Cited

FOREIGN PATENT DOCUMENTS

| CA | 2561337 | 9/1999 |
|---|---|---|
| CA | 2345490 A1 | 10/2001 |
| CA | 2811026 A1 | 3/2012 |
| CA | 2885569 A1 | 9/2015 |
| CA | 2887975 A1 | 9/2016 |
| CA | 2995818 A1 | 8/2018 |
| CA | 2996760 A1 | 9/2018 |
| CA | 2998616 A1 | 9/2018 |
| DE | 69908558 | 4/2004 |
| DE | 69922609 | 12/2005 |
| DE | 202006017459 U1 | 6/2007 |
| EP | 0391282 A2 | 10/1990 |
| EP | 1056639 | 12/2000 |
| EP | 0994016 B1 | 12/2004 |
| JP | 61-222877 A | 10/1986 |
| JP | 2001-153168 A | 6/2001 |
| WO | 99/43540 | 9/1999 |
| WO | 2017/079503 A1 | 5/2017 |
| WO | WO-2019147162 A1 * | 8/2019 |

OTHER PUBLICATIONS

Examination Report issued by the Canadian Patent Office, dated Dec. 13, 2018, for Canadian Patent Application No. 2,998,616; 3 pages.

Examination Search Report issued by the Canadian Patent Office, dated Dec. 14, 2018, for Canadian Patent Application No. 2,996,760; 3 pages.

International Preliminary Report on Patentability issued by European Patent Office, dated Jan. 26, 2018, for International Patent Application No. PCT/US2016/060441; 27 pages.

International Search Report and Written Opinion of the International Searching Anthority, dated Apr. 18, 2017, for related International Patent Application No. PCT/US2016/060441; 24 pages.

Office Action issued by the Canadian Intellectual Property Office, dated Apr. 10, 2019, for Canadian Patent Application No. 3,003,473; 4 pages.

Office Action issued by the Canadian Intellectual Property Office, dated Aug. 27, 2019, for Canadian Patent Application No. 2,996,760; 3 pages.

Office Action issued by the Canadian Intellectual Property Office, dated Oct. 4, 2019, for Canadian Patent Application No. 2,998,616; 5 pages.

SnoWest Snowmobile Forum, View Single Post-380 mountain mini, Jan. 11, 2017, available at http://snowest.com/forum/showpost.php?p= 4009975&postcount=61; 4 pages.

Technical Preview, SnowTech, Crazy Mountain Xlreme Bike Kil, Sep. 2015; 3 pages.

Photo of "Suddenly, the advanced Allouette" available from Aloutte Recreational Products Ltd., 1 pg, snowmobile vailable at least as early as 1974, last accessed Sep. 30, 2020.

Photo of sno-brute 440 C Competition Model, snowmobile available at least as early as 1974, last accessed Sep. 30, 2020.

Photo of Trail-Rider slide suspension, snowmobile available at least as early as 1974, last accessed Sep. 30, 2020.

Time Machines Facebook post, 1 pg, snowmobile available at least as early as 1974, last accessed Sep. 30, 2020.

* cited by examiner

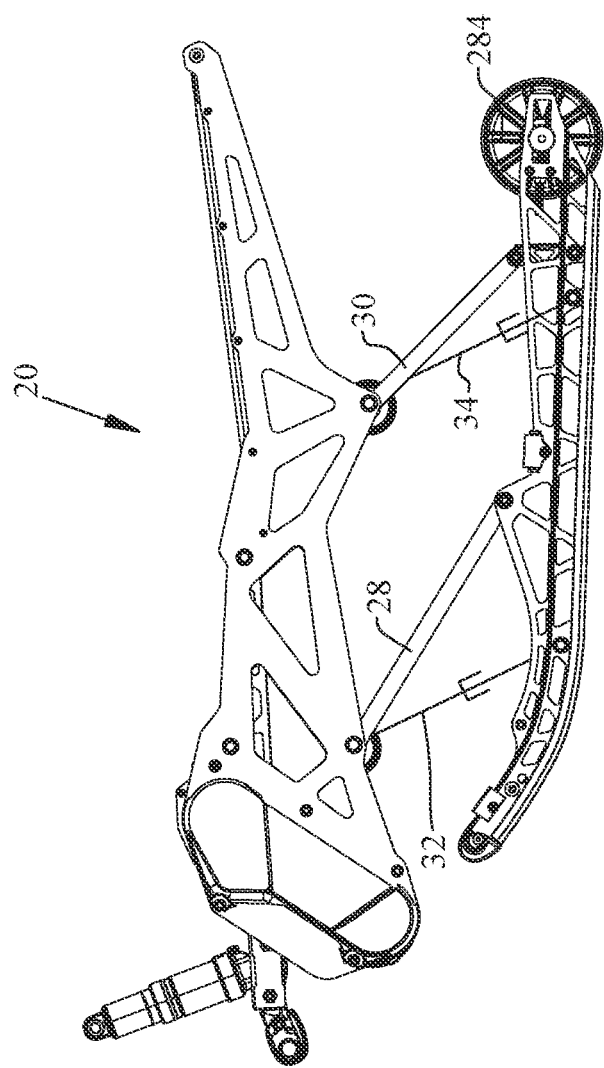

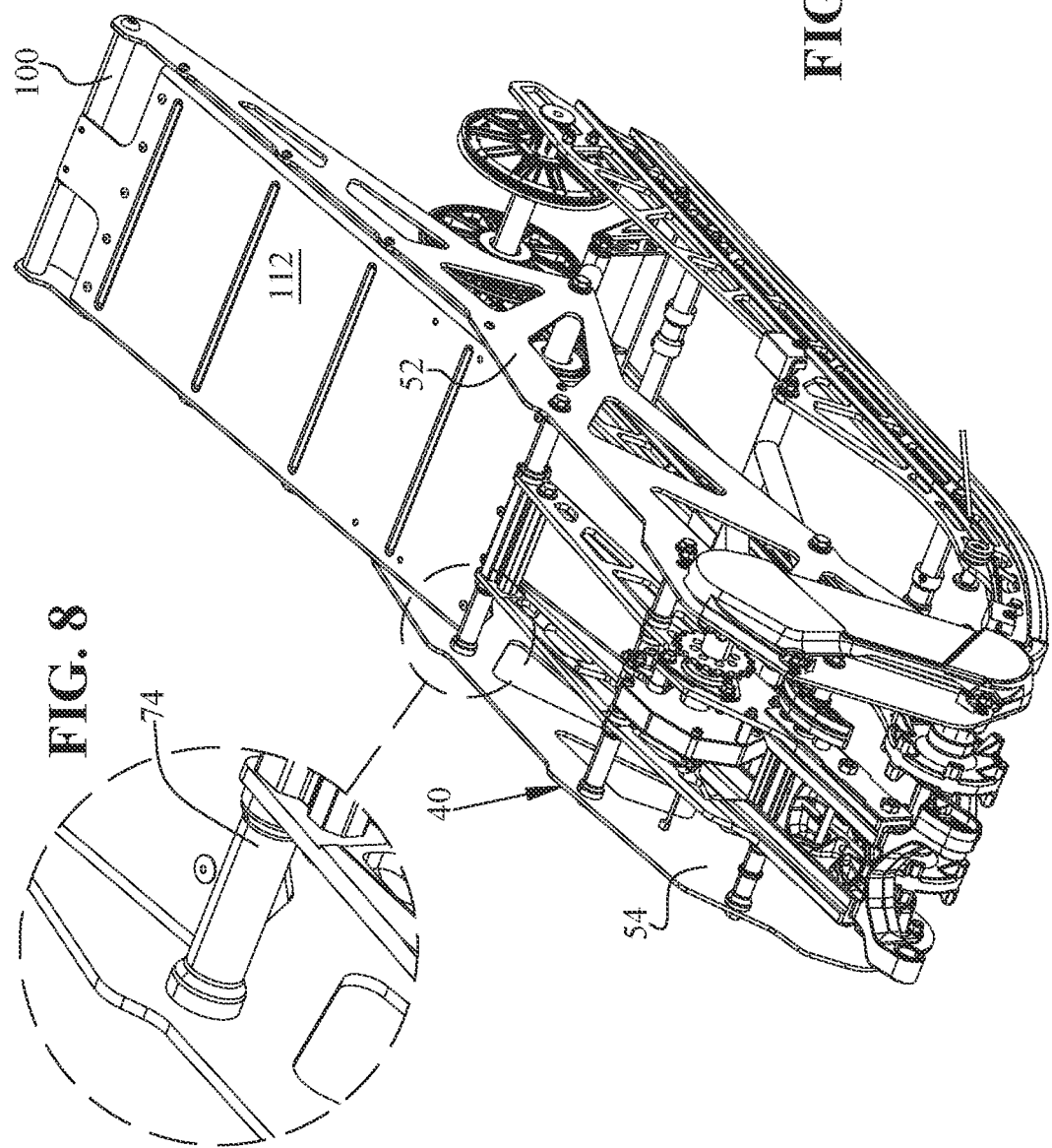

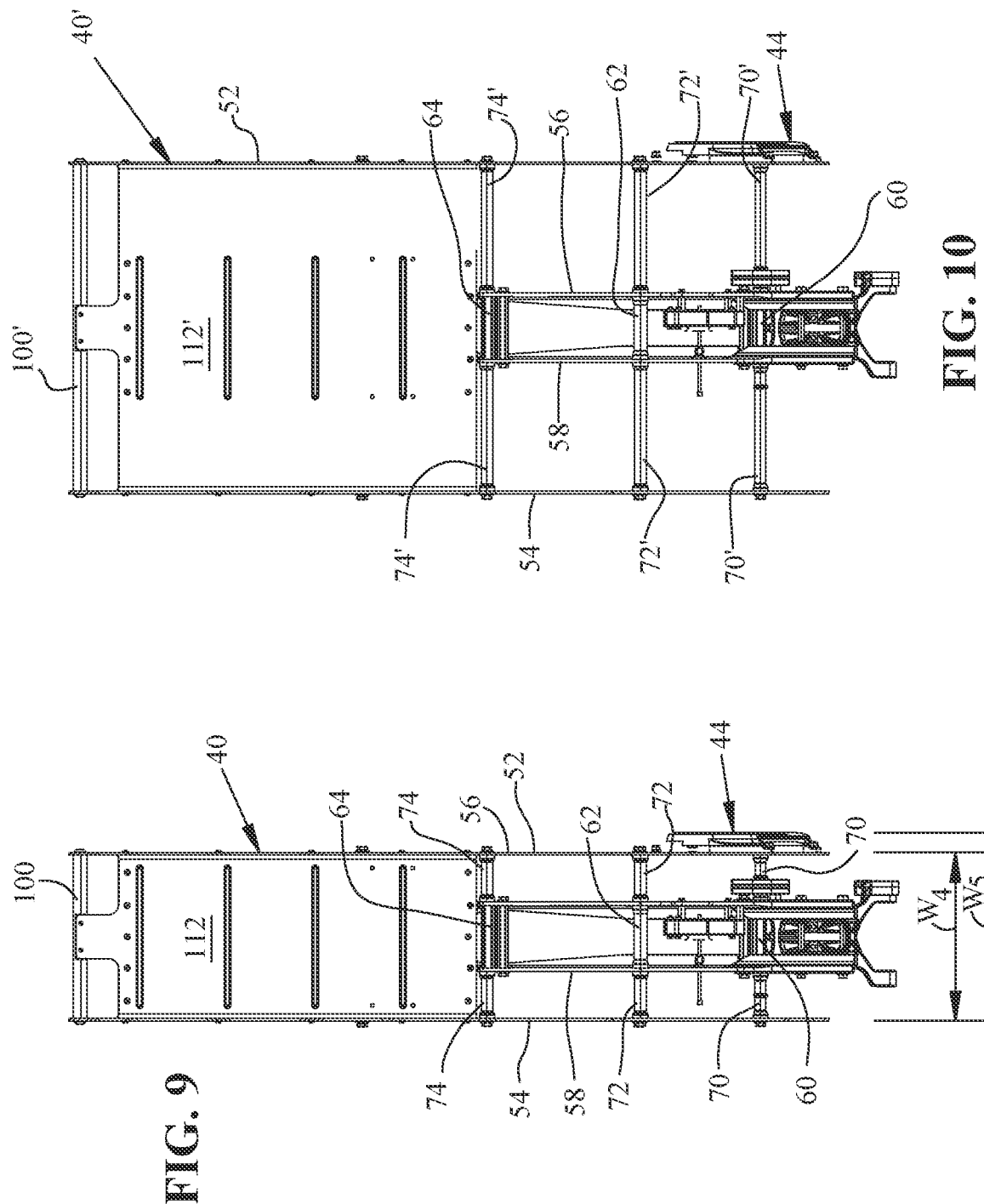

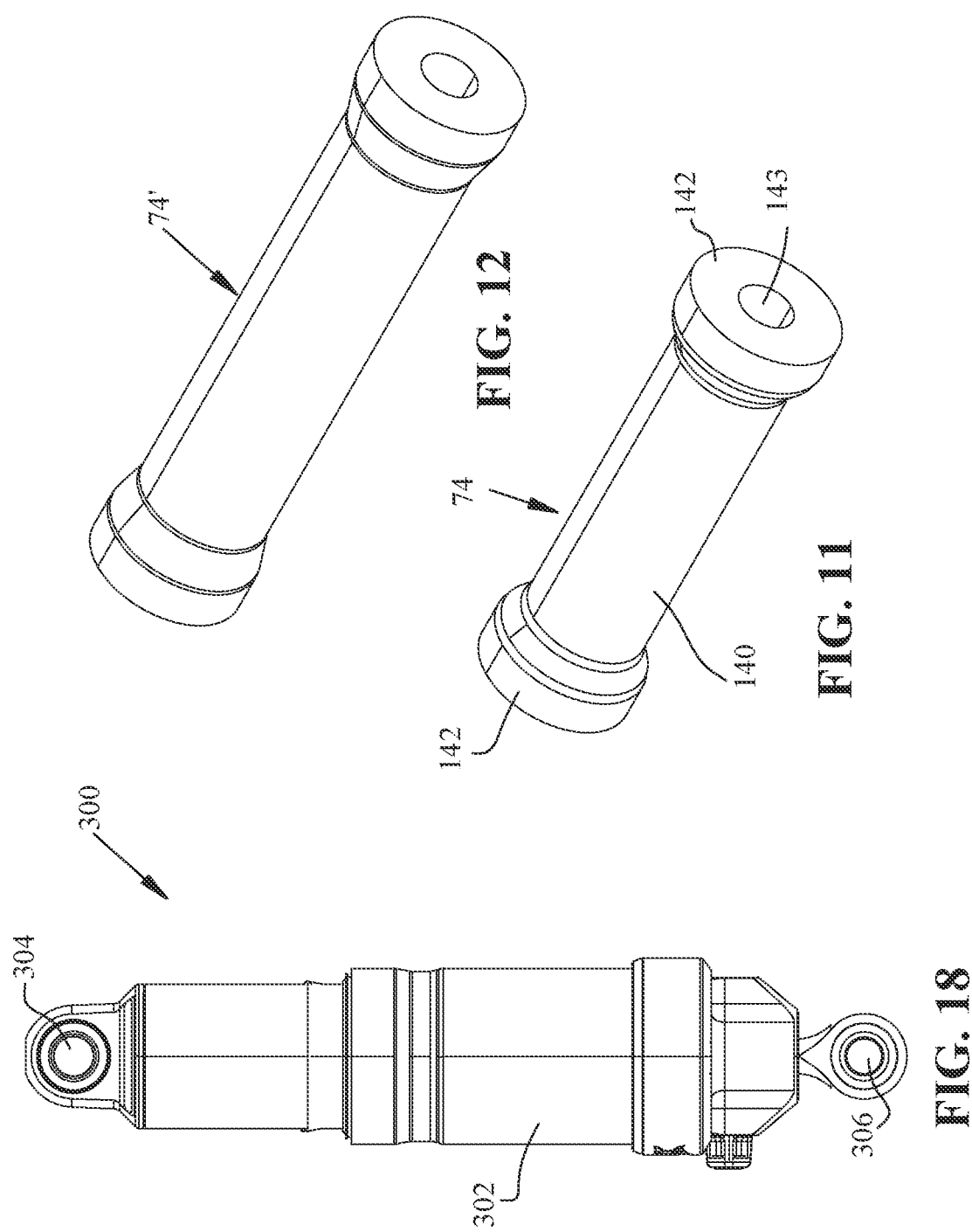

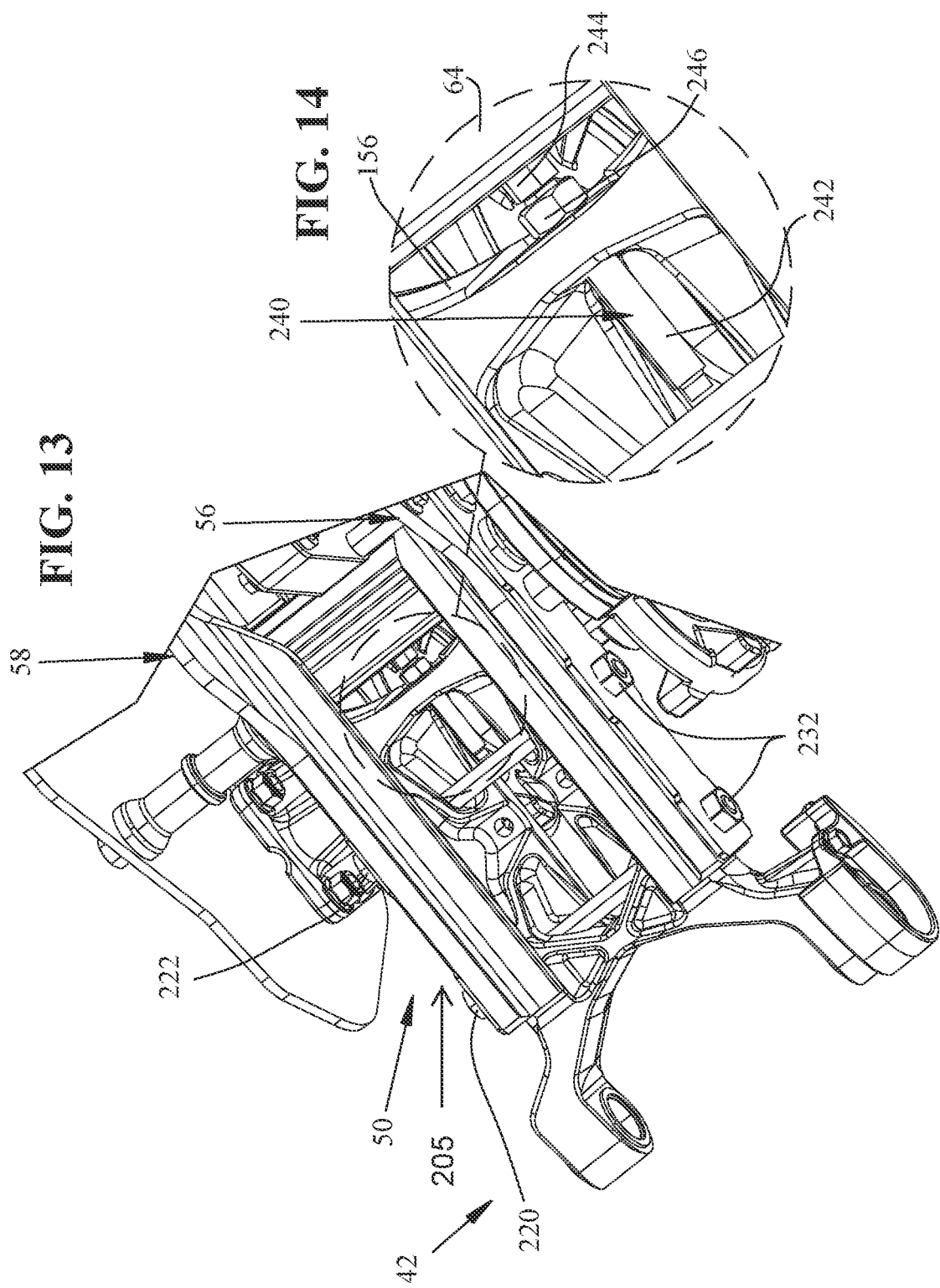

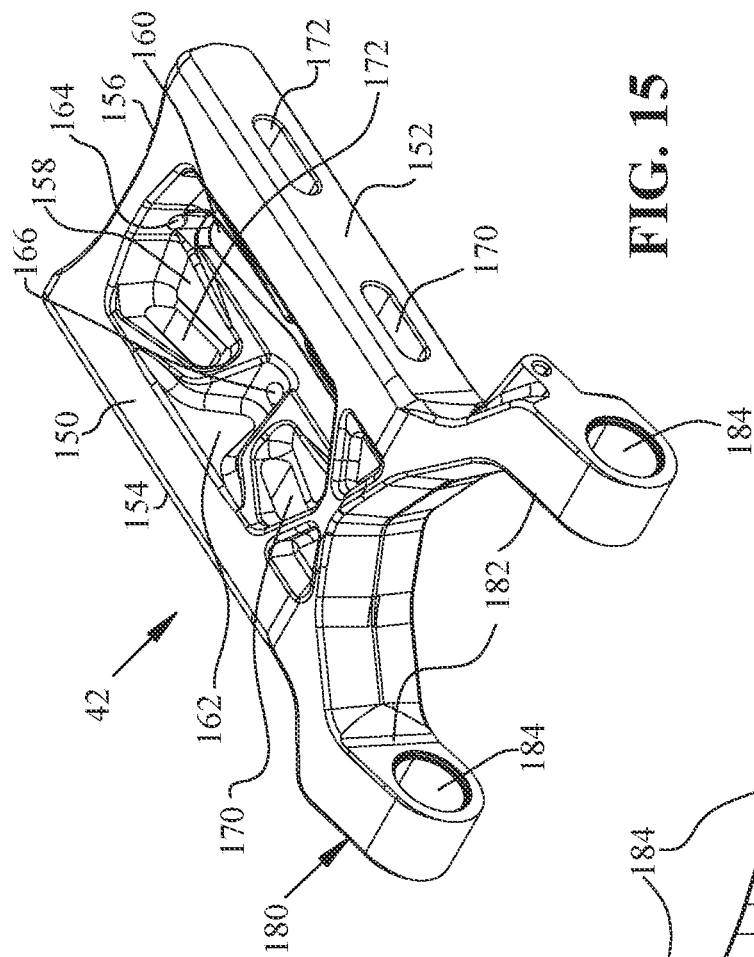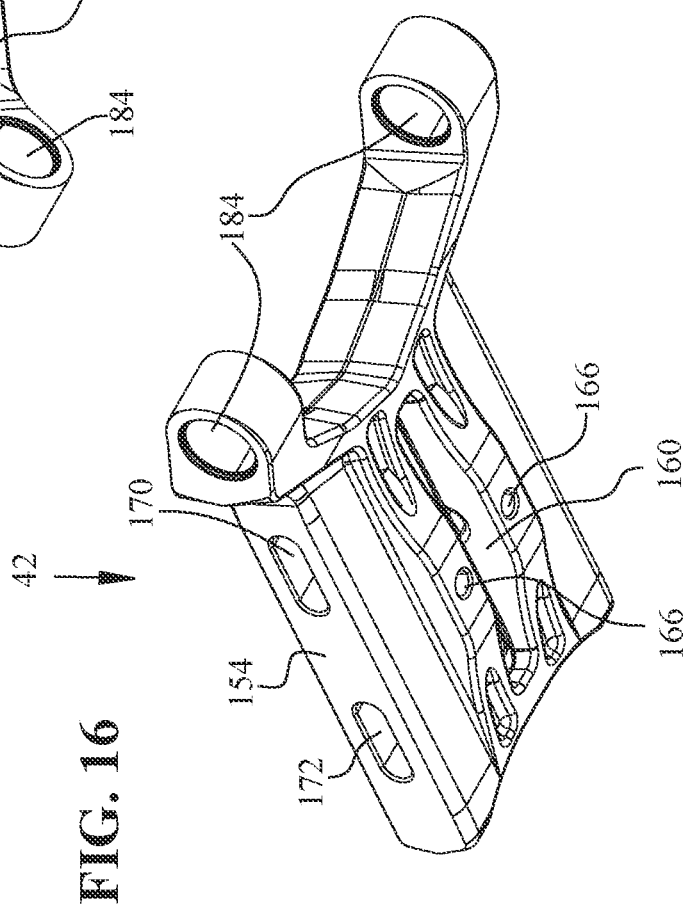

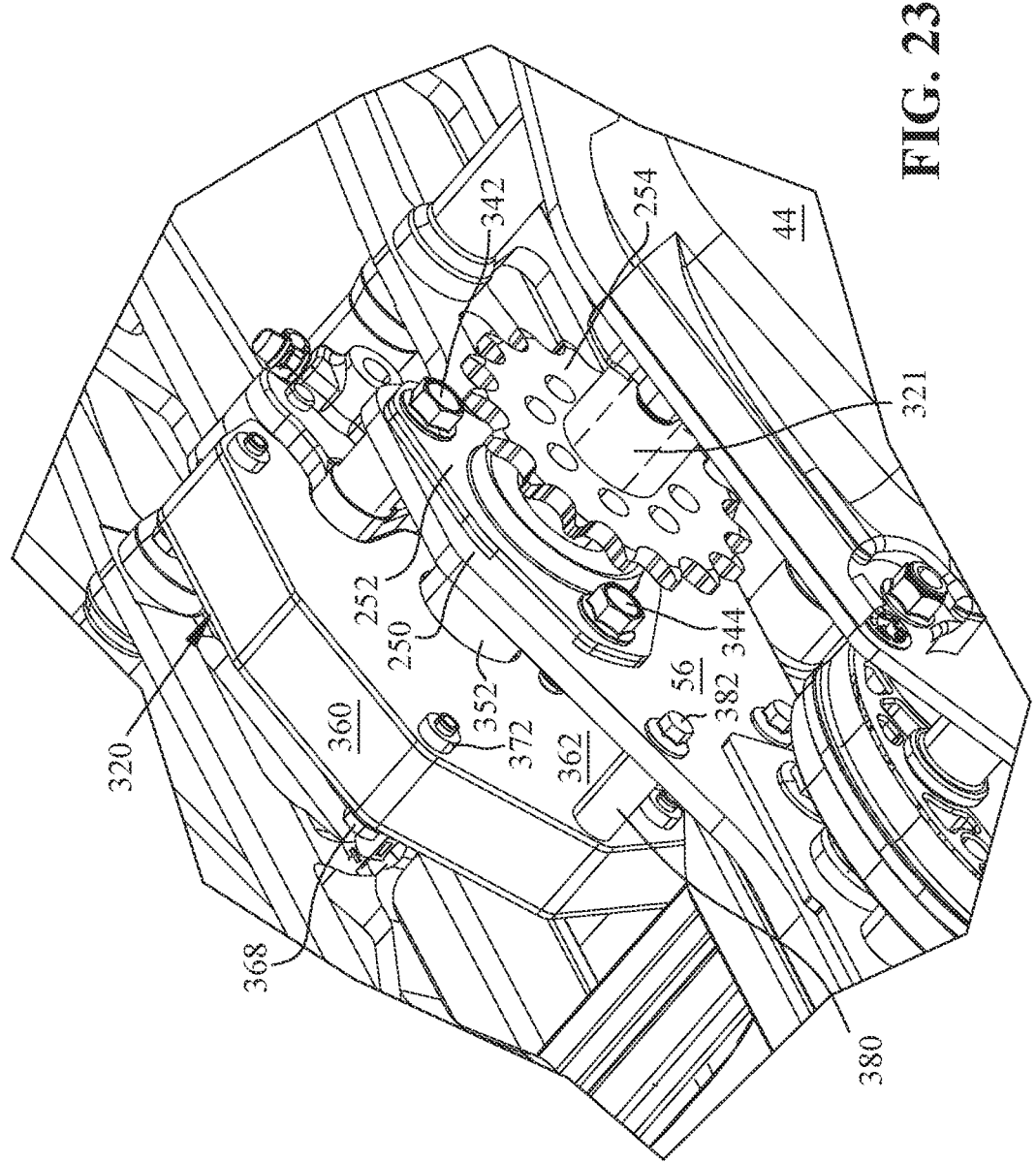

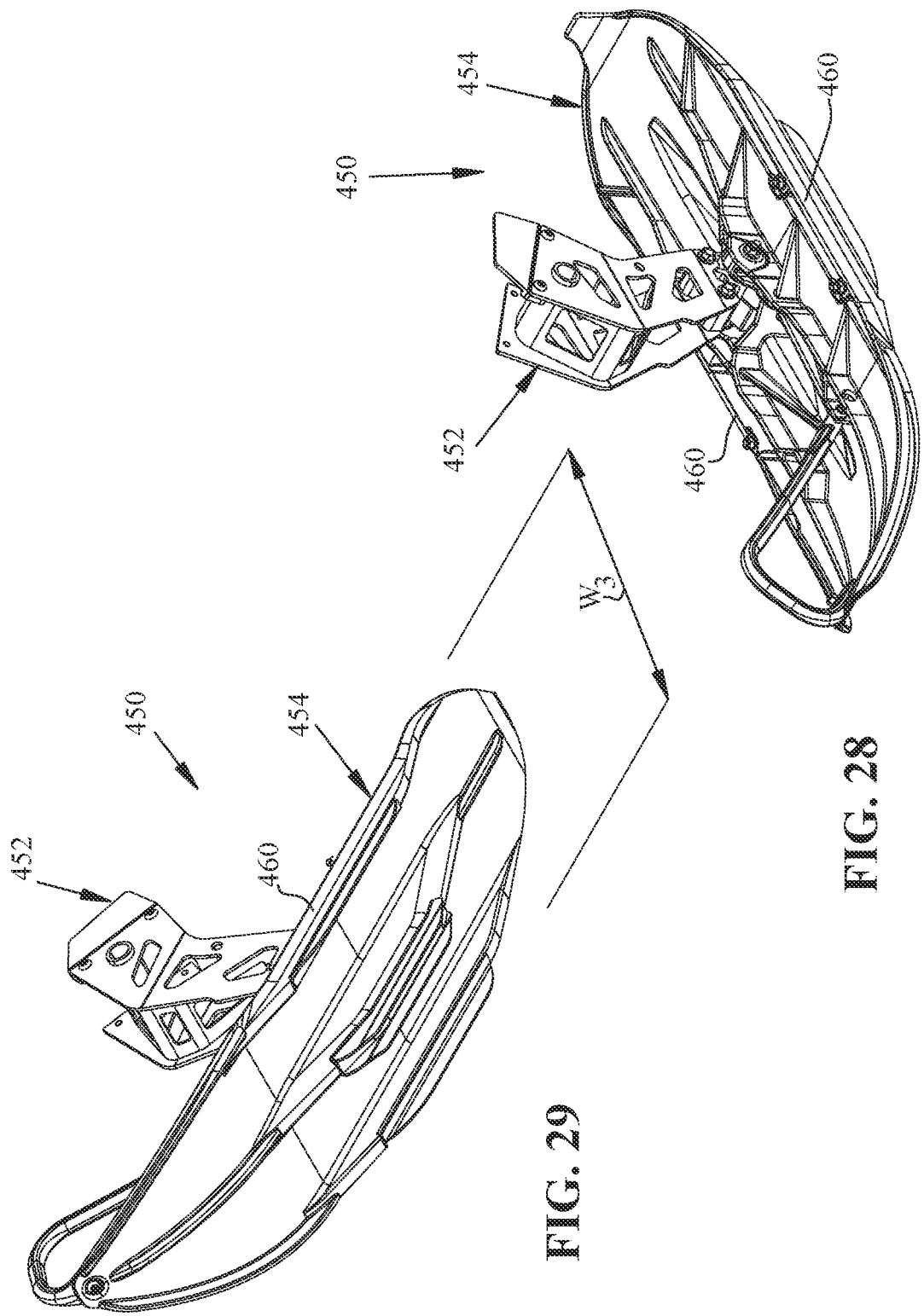

SNOW VEHICLE

CROSS-REFERENCE TO RELATED APPLICATION

The present application is a divisional of U.S. patent application Ser. No. 15/449,467, filed Mar. 3, 2017, and entitled "SNOW VEHICLE," the complete disclosure of which is expressly incorporated by reference herein.

BACKGROUND

The present disclosure relates to snow vehicles including snowmobiles and or snow bikes.

Many types of vehicles are configured with tracks to drive in the snow. Regardless of whether the vehicle is a snowmobile or a wheeled vehicle converted to a tracked vehicle, tracked vehicles typically include a drive shaft mounted to a suspension system that supports the endless track. The drive shaft typically includes drive sprockets that engage the endless track. In the case of snow bikes, it is common that a motor bike is converted by removing the front tire and replacing it with a ski, and by removing the rear tire and replacing it with a rear suspension having a drive belt. Thus it is advantageous if the transition from the motor bike to the snow bike is made as easy as possible.

One such snow vehicle is shown in our U.S. Pat. No. 8,910,738, the subject matter of which is incorporated herein by reference. This patent discloses a conversion of a motorbike into a snow vehicle where the motorbike powertrain is utilized to power the track of the converted snow vehicle. Other such snow bikes are known from our US patent applications, namely: Publications 2015/0144412; 2015/0259032; 2016/0280331 and application Ser. Nos. 14/935,224; 14/935,265 and 15/165,862; the subject matter of which are incorporated herein by reference.

SUMMARY

In a first embodiment, a rear suspension is provided for a snow vehicle having a vehicle frame and a propulsion drive member for driving the belt. The rear suspension comprises a rear suspension frame; a drive belt coupled to the rear suspension frame; a propulsion driven member supported by the rear suspension frame; a linear element coupling the propulsion drive member and the propulsion driven member to drive the drive belt; a coupler for mounting to the rear suspension frame and for coupling the rear suspension frame to the vehicle frame; a fastening assembly for fixing the coupler relative to the rear suspension frame; and a linear assist member for assisting the movement of the coupler relative to the rear suspension. When the coupler is fixed relative to the rear suspension frame, the propulsion drive member and propulsion driven member are fixed relative to each other, and when the fastening assembly allows relative movement of the rear suspension frame and the vehicle frame, the linear assist member may be activated to move the propulsion drive member and propulsion driven member relative to each other, to tighten the linear element.

In another embodiment, a rear suspension is provided for a snow vehicle having a vehicle frame and a propulsion drive member for driving the belt. The rear suspension comprises a rear suspension frame having a front receiving area extending along a generally horizontal plane; a drive belt coupled to the rear suspension frame; a coupler for mounting to the rear suspension frame and coupling the rear suspension frame to the vehicle frame, the coupler having a generally rectangular body portion which extends in a generally horizontal plane and which is receivable in the front receiving area; a fastening assembly for fixing the coupler relative to the rear suspension frame.

In another embodiment, a kit is provided for converting a motor bike into a snow bike, where the motor bile has a bike frame and a propulsion member. The kit comprises a rear suspension having a suspension frame and a drive belt coupled to the rear suspension frame, the drive belt being coupled to the suspension member and having a belt width; and a front ski coupled to a steering mechanism of the motor bike, the front ski having a ski width. The ski width is equal to or greater than the belt width.

In yet another embodiment, a rear suspension is provided for a snow vehicle having a vehicle frame and a propulsion drive member for driving the belt. The rear suspension comprises a rear suspension frame; a drive belt coupled to the rear suspension frame; a propulsion driven member supported by the rear suspension frame; a linear element coupling the propulsion drive member and the propulsion driven member to drive the drive belt; and a brake mechanism coupled to the propulsion driven member and having a cover substantially surrounding the brake mechanism.

BRIEF DESCRIPTION OF THE DRAWINGS

The invention will now be described in relation to the drawing figures where:

FIG. 6 shows a left hand side view of the rear suspension;

FIG. 7 shows a left front perspective view of the rear suspension;

FIG. 8 is an enlarged portion of the area denoted in FIG. 7;

FIG. 9 shows a top view of a narrow track frame;

FIG. 10 shows a top view of a wide track frame;

FIG. 11 shows a short spool for use in assembling the narrow track frame of FIG. 9;

FIG. 12 shows a long spool for use in assembling the wide track frame of FIG. 10;

FIG. 13 shows a top perspective view of the chain tensioning mechanism;

FIG. 14 is an enlarged portion of the area denoted in FIG. 13;

FIG. 15 is a top perspective view of the forged coupler shown in FIG. 13;

FIG. 16 is an underside perspective view of the forged coupler shown in FIG. 13;

FIG. 18 is a side view of the shock absorber coupled between the motor bike frame and rear suspension;

FIG. 23 shows an enlarged perspective view of the brake mounted within the frame;

FIG. 28 is a front left perspective view of the front ski; and

FIG. 29 is an underside perspective view of the ski of FIG. 28.

DETAILED DESCRIPTION OF THE EMBODIMENTS

Figure 1:
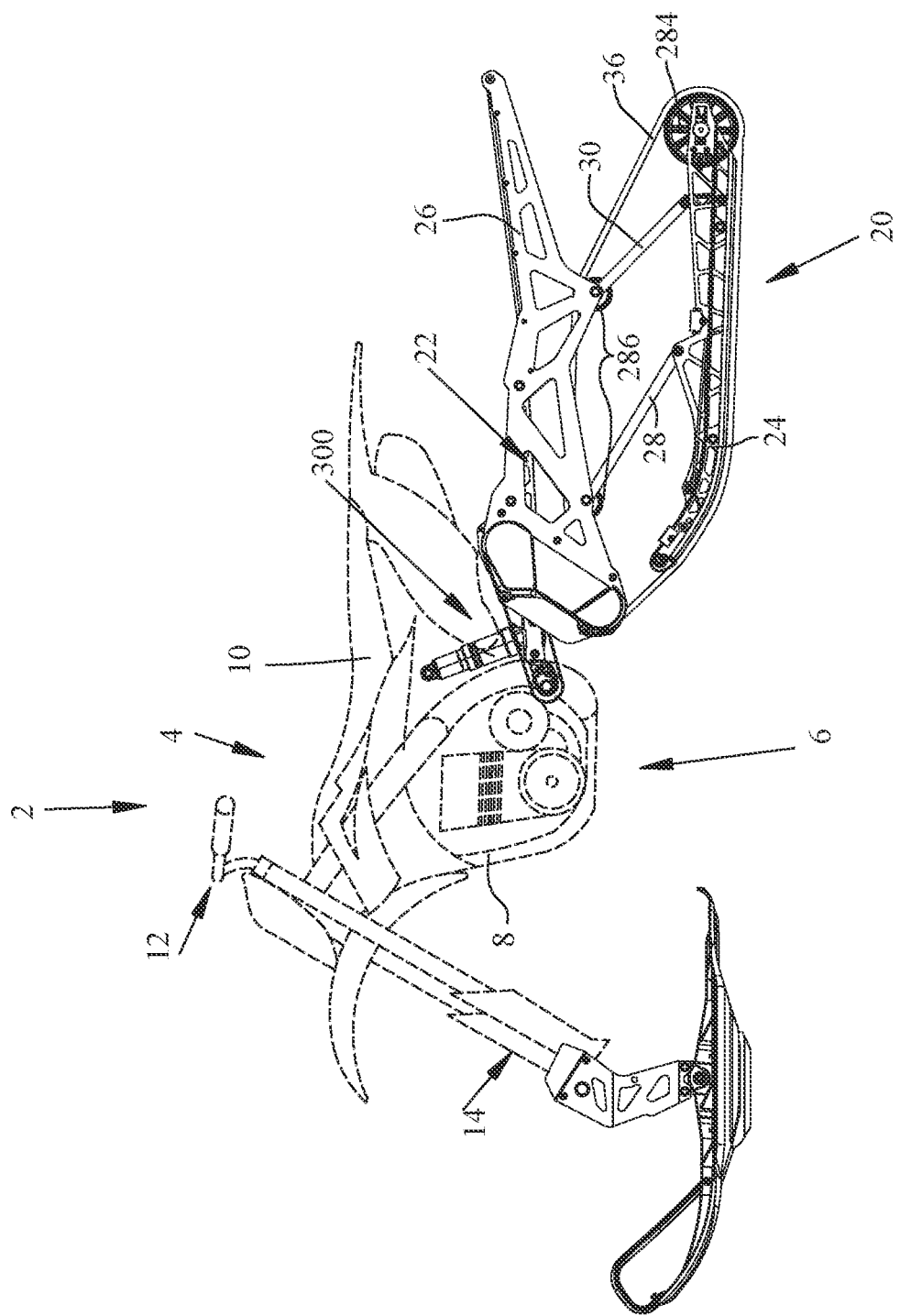
FIG. 1 is a side view of the snow vehicle as disclosed in the present disclosure.

With reference first to FIG. 1, a snow vehicle is shown generally at 2 as comprised of a motorcycle portion 4 having a propulsion unit 6, which is shown as a two-cylinder motorcycle engine, a frame 8, an operators seat 10, and a steering assembly 12 which includes a front fork 14. A rear suspension assembly 20 is shown having an upper frame portion 22, slide rails 24, side panels 26, control arms 28, 30, linear force elements 32 and 34 (shown diagrammatically in FIG. 6 as shock absorbers) and an endless belt or drive track 36.

Figure 2:
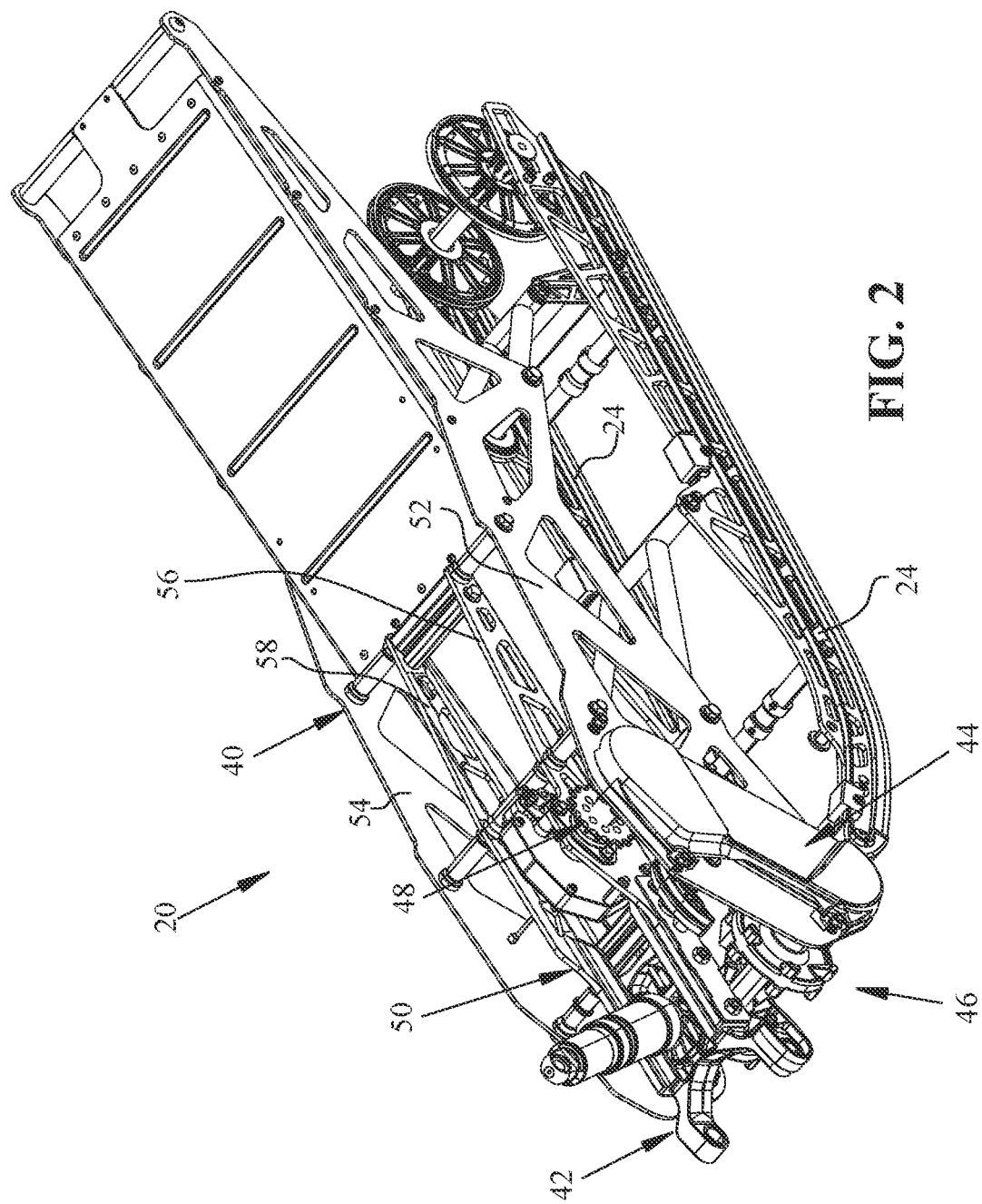
FIG. 2 shows a left front perspective view of the rear suspension.
Figure 2A:
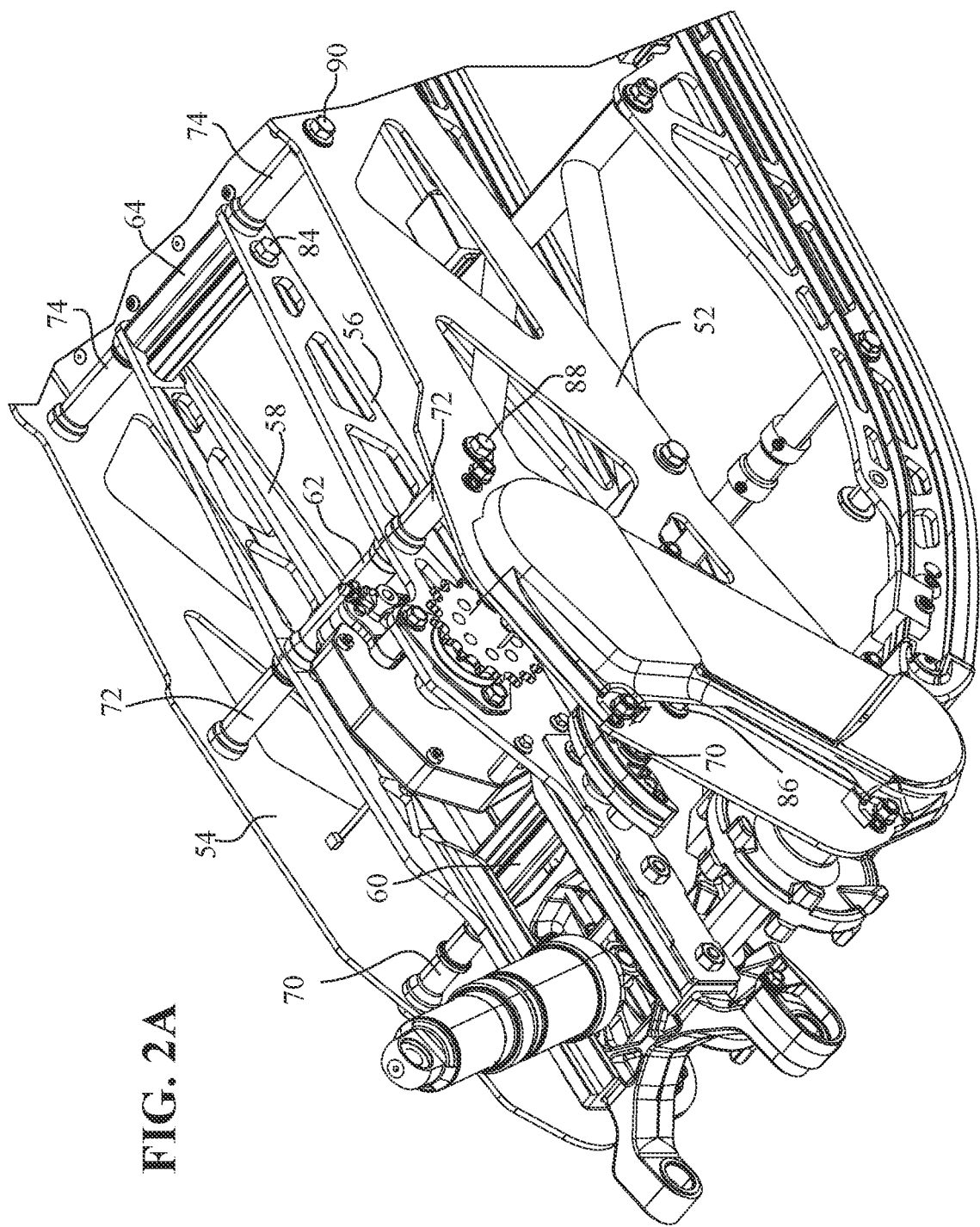
FIG. 2A is an enlarged portion of the front frame shown in FIG. 2.

With reference now to FIGS. 2-6, rear suspension 20 will be described in greater detail. With reference first to FIG. 2, rear suspension 20 includes a modular frame portion 40, a front coupler 42, and a chain transfer case 44 which couples track drive 46 to an input chain drive 48. Rear suspension 20 also includes a linear assist member or chain tensioning mechanism 50 as further described herein. Modular frame portion 40 includes side panels 26 which are defined as left-hand plate portion 52 and right-hand plate portion 54 which extend a substantial length of the modular frame 40. As shown best in FIG. 2A, center spine portions include a left-hand spine portion 56 and a right-hand spine portion 58 where spine portions 56, 58 are spaced apart by a front spacer 60, a middle spacer 62 and a rear spacer 64. Meanwhile, plate portions 52 and 54 are spaced apart from spine portions 56, 58 by way of a front spacer 70, middle spacer 72 and rear spacer 74. Spacer 60 and 64 are hourglass-shaped in cross section (See FIG. 17A) having apertures 80 and 82. Thus, one fastener 84 (FIG. 2A) can be positioned through the front side of spacer 64 to couple the spine portions 56 and 58 together, while fasteners 86, 88 and 90 couple the outer plates 52, 54 to the center spines 56, 58 (FIG. 2A).

Figure 3:
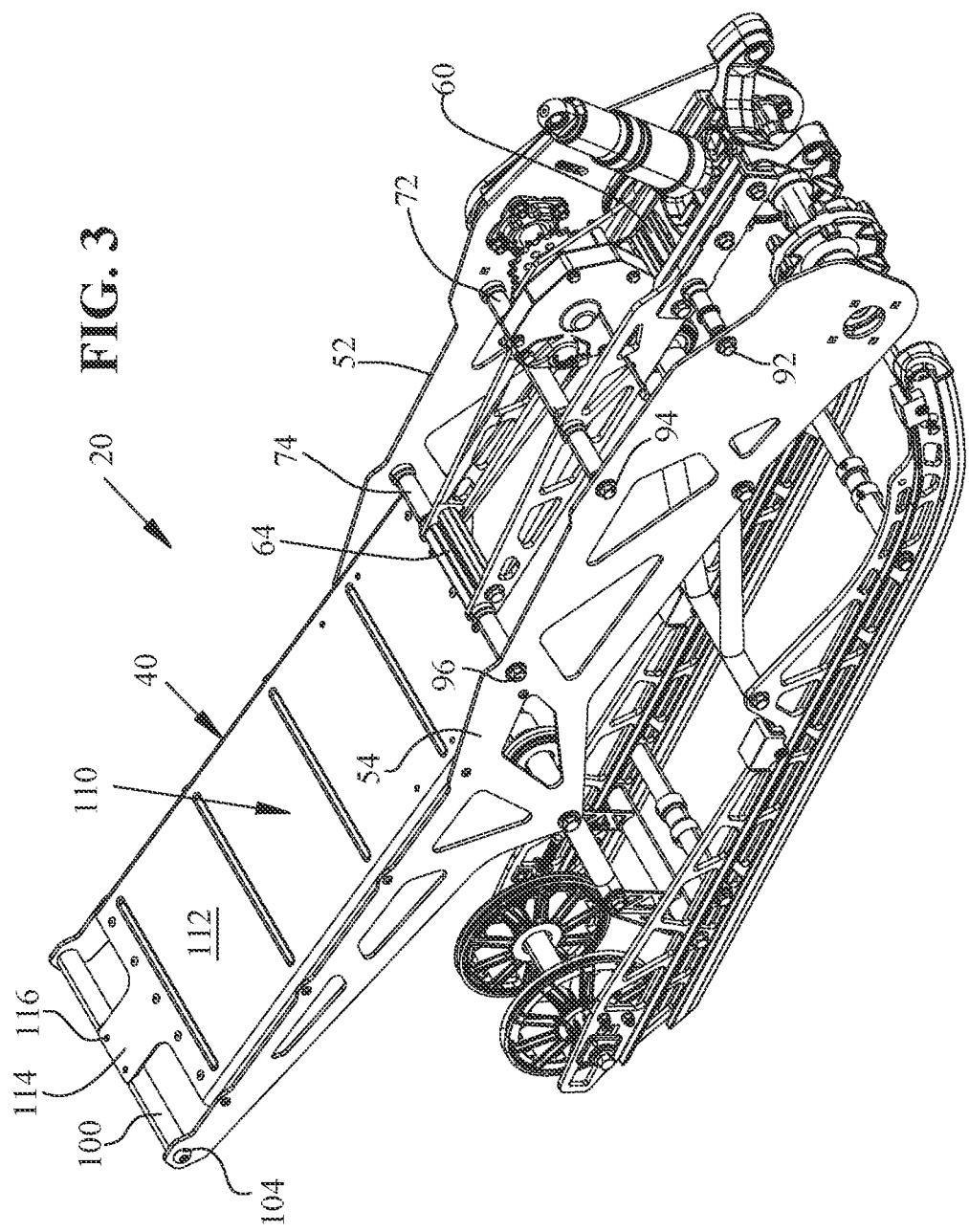
FIG. 3 shows a right front perspective view of the rear suspension.

Namely, fastener 86 is positioned through plate portion 52, through the left-hand side spacer 70, through spine portion 56, through spacer 60, through right-hand side spacer 70, and through plate 54 to receive a fastener 92 (FIG. 3). In a like manner, fastener 88 is positioned through plate portion 52, through left-hand side spacer 72, through spacer 62, through right-hand side spacer 72, and through plate portion 54 to receive a fastener 94 (FIG. 3). Finally, fastener 90 can be positioned through plate portion 52, through left-hand side spacer 74, through spacer 64, through right-hand side spacer 74, through plate portion 54 to receive the fastener 96 (FIG. 3). It should be appreciated that the fasteners 86, 88 and 90 could be elongated bolts whereas fasteners 92, 94 and 96 are nuts which thread on the end of bolts 86, 88 and 90; alternatively all of fasteners 86, 88, 90, 92, 94 and 96 could be bolts where the spacers 60, 62 and 64 are internally threaded to receive the aforementioned bolts.

Figure 4:
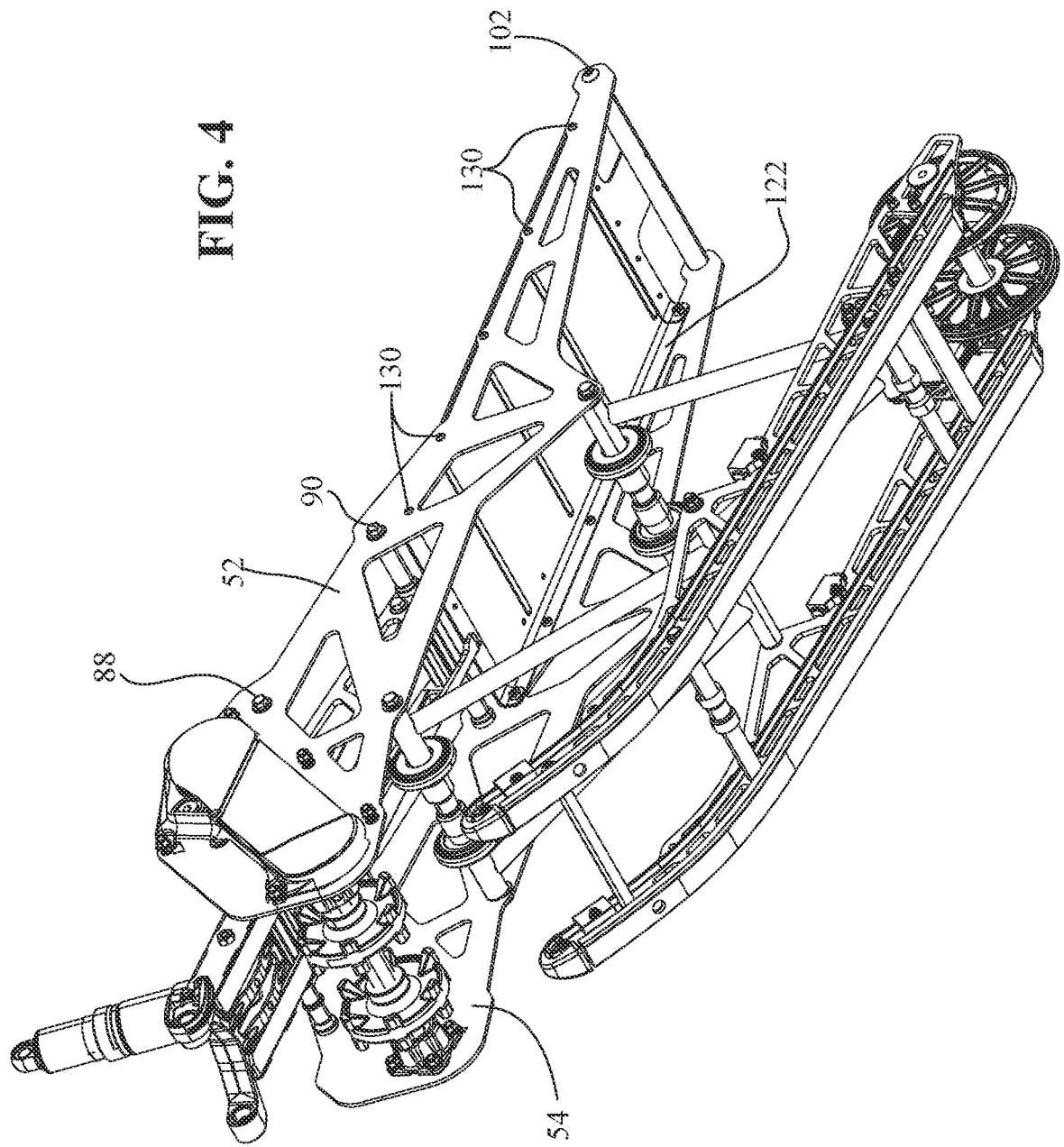
FIG. 4 shows a left front underside perspective view of the rear suspension.
Figure 5:
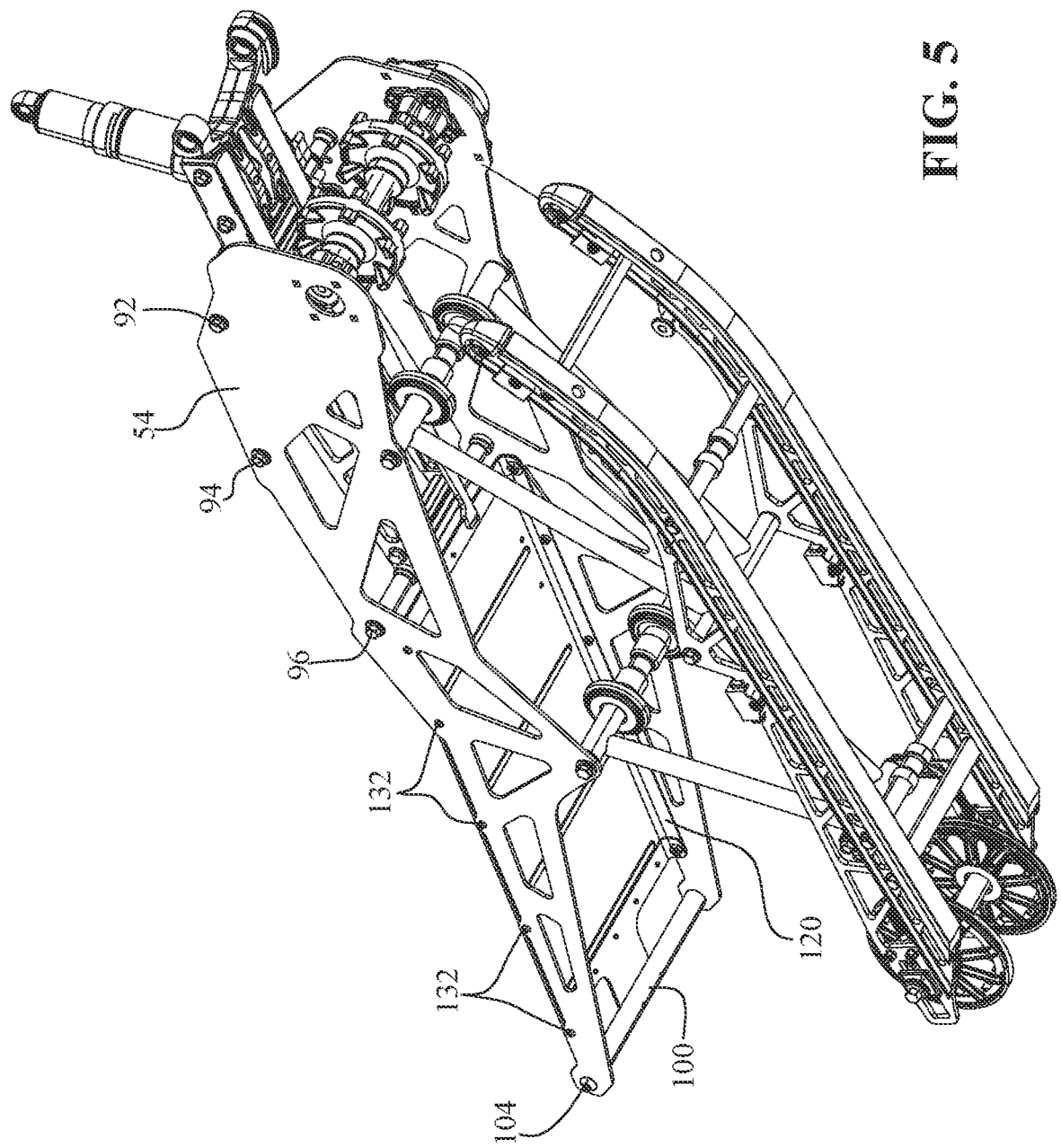
FIG. 5 shows a right front underside perspective view of the rear suspension.

As shown best in FIGS. 3-5, the rear of upper frame portion 40 includes a rear spacer 100 having fastener 102 (FIG. 4) and fastener 104 (FIG. 3) to couple plate portions 52, 54 together and spaced apart by spacer 100. A tunnel portion 110 is defined by a plate 112 which couples to spacer 100 at a rear portion 114 by way of fasteners 116. Plate portion 112 includes folded-over side edges 120 (FIG. 5) and 122 (FIG. 4) which couple to plate portions 52, 54 by way of fasteners 130 (FIG. 4) and 132 (FIG. 5).

With the design of the upper frame portion 40 as described above, the modular design provides for an easy approach to accommodate multiple frame widths. With reference to FIGS. 7-11, spacer 74 is shown in greater detail. As shown, spacer 74 is somewhat spool-shaped having a center portion 140 and embossed ends 142 having an aperture 143 therethrough. With reference to FIG. 9, spacer 74 is a narrow spacer such that the width of the upper frame portion 40 is also narrow. As shown in FIG. 12, an elongate spacer 74' is shown. This yields a wider frame upper portion 40' by including longer spacers 70', 72' and 74', and an elongate end portion 100' and tunnel plate portion 112', as shown in FIG. 10.

With reference now to FIGS. 13-17B, front coupler 42 and chain tensioning mechanism 50 will be described in greater detail. With reference first to FIG. 15, front coupler 42 is shown as a forged coupler including a base portion 150 having side walls 152, 154 and an end wall 156. The base portion 150 has a hollowed out section 158 defining a through passage way at 160 and hollow well portions 162. A threaded aperture 164 extends through the rear wall 156 and into the hollow portion 158. Wells 162 include a threaded aperture at 166 which will be described in greater detail herein. Side walls 152 and 154 include front slotted apertures 170 therethrough and rear slotted apertures 172. A yoke 180 extends forwardly from the base portion 150 including two yoke arms 182 having apertures at 184. As shown best in FIG. 13, forged coupler 42 is received in a front end of spine portions 56 and 58 such that apertures 184 (FIG. 15) project forwardly and provide the coupling to the frame of the motorbike frame.

Figure 17A:
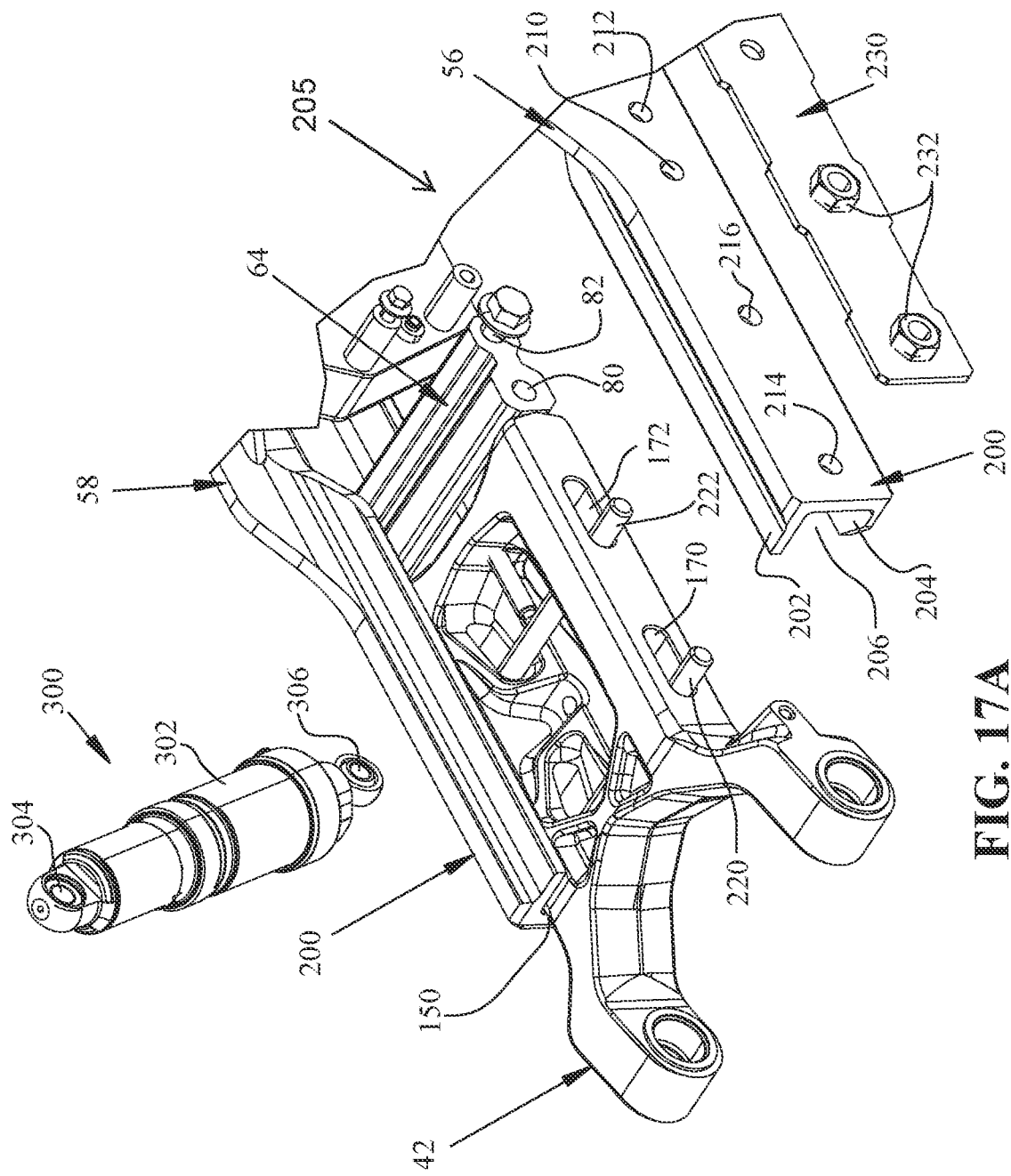
FIG. 17A is a view similar to that shown in FIG. 13, showing the left spine member exploded away from the forged coupler, with the forged coupler in a fully retracted position.

With reference now to FIGS. 13, 14, 17A and 17B, the chain tensioning mechanism 50 will be described in greater detail. With reference first to FIG. 17A, a front end of spine portions 56 and 58 is shown, where each front end includes a channel-shaped portion 200 defined by an upper wall portion 202 and a lower wall portion 204 defining a channel 206 therebetween. It should be appreciated that in FIG. 17A, spine portion 56 is spaced apart from its normal location, having been removed from spacer 64 to show the clarity of the forged coupler 42 in the channel-shaped portion of spine portion 58. Channel-shaped portion 200 further includes an aperture 210 which aligns with aperture 80 in spacer 64 and an aperture 212 which aligns with aperture 82 in spacer 64. Channel-shaped portion 200 further includes a front aperture 214 which generally aligns with slot 170 and an aperture 216 which generally aligns with slot 172. As shown in FIGS. 13 and 17A, a fastening assembly 205 is configured for fixing the coupler 42 relative to the rear suspension frame portion 40 and may comprise at least a fastener 220, a fastener 222, and a fastener plate 230. Fastener 220 is positioned through apertures 214 of spine portions 56, 58 and through slotted portion 170. In a like manner, fastener 222 extends through apertures 216 of spine portions 56 and 58 and through slot 172. Fastener plate 230 is provided having nuts 232 positioned in spaced-apart manner to align with apertures 214 and 216. As disclosed, nuts 232 are welded to fastener plate 230. This provides an easy one-person operation, as only the fasteners 220, 222 (FIG. 17A) require a tool to loosen them.

Thus, this design allows for simple chain tensioning adjustment. When fasteners 220 and 222 extend through corresponding apertures 214 and 216, fastening plate 230 can be positioned against apertures 214 and 216, and fasteners 220, 222 can be threadibly received in nuts 232. It should be appreciated from viewing FIG. 17A that forged coupler 42 is in its rearward-most or retracted position where a front edge of slot 170 is pushed against fastener 220 and where a front edge of slot 172 is pushed against fastener 222. Thus, forged coupler 42 may be held in position trapped in between the spine portions 56 and 58 and more particularly, in the channel-shaped portions 200 of each of the spine portions 56, 58.

Figure 17B:
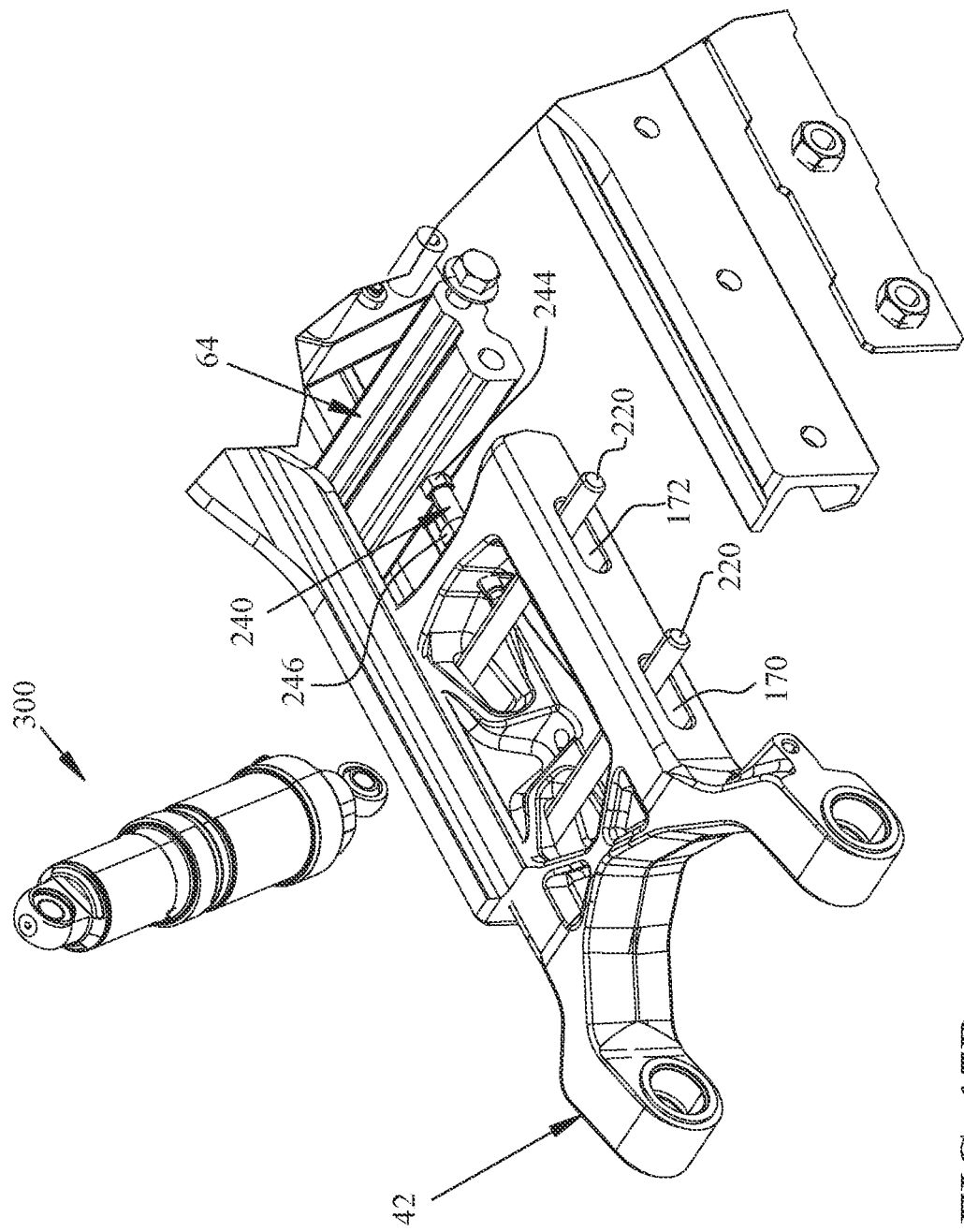
FIG. 17B is a view similar to that shown in FIG. 17A, with the forged coupler in a fully extended position.

With reference now to FIG. 14, a jack bolt 240 is provided which is threadibly received in threaded aperture 164 (FIG. 15) and includes a threaded shank at 242, a head 244 and a lock nut is provided at 246. It should also be appreciated from FIG. 14, that end wall 156 is curved thereby providing a spacing between end wall 156 and spacer 64. This allows the head 244 and lock nut 246 to be positioned between the end wall 156 and spacer 64. Thus, chain tensioning is provided in a very simple operation by loosening fasteners 220 and 222 which allow forged coupler 42 to move relative to spine portions 56, 58. As jack bolt 240 is centrally located between spine portions 56, 58, retracting jack bolt 240 that is, turning head 244 in a counter-clockwise position, would cause head 244 to abut spacer 64. Continued turning of head 244 in a counter clockwise direction moves forged coupler 42 and upper frame portion 40 relative to each other. Thus, this provides chain tensioning with the chain drive 48 whereby lock nut 246 can be moved in a clockwise position tightening the lock nut against end wall 156 locking the jack bolt 240 in its position. As shown in FIG. 17B, forged coupler 42 is in its forward-most or extended position where a rear edge of slot 170 is pulled against fastener 220 and where a rear edge of slot 172 is pulled against fastener 222.

Figure 19:
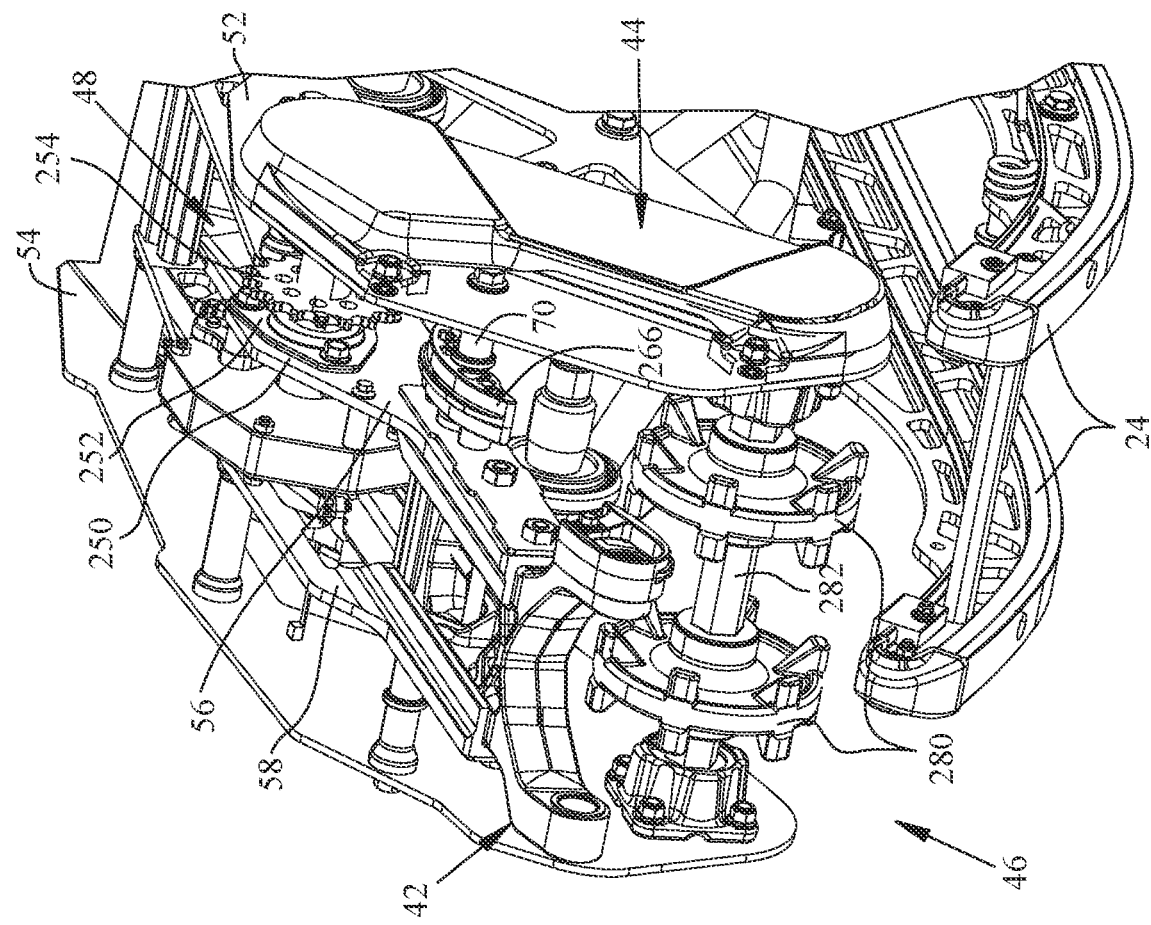
FIG. 19 is an enlarged front perspective view of the front of the snow bike showing the chain input drive, chain casing and belt drive.
Figure 20:
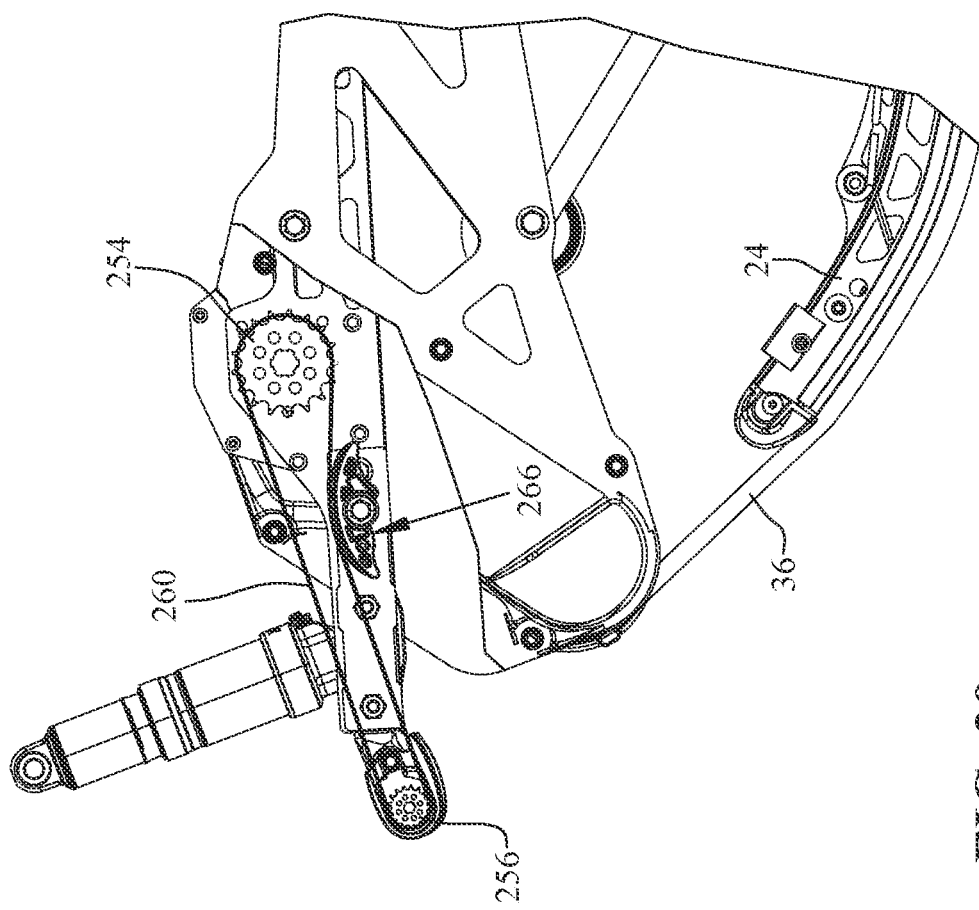
FIG. 20 is a side view of the snow bike showing a front of the snow bike partially broken away to show the chain drive.
Figure 21:
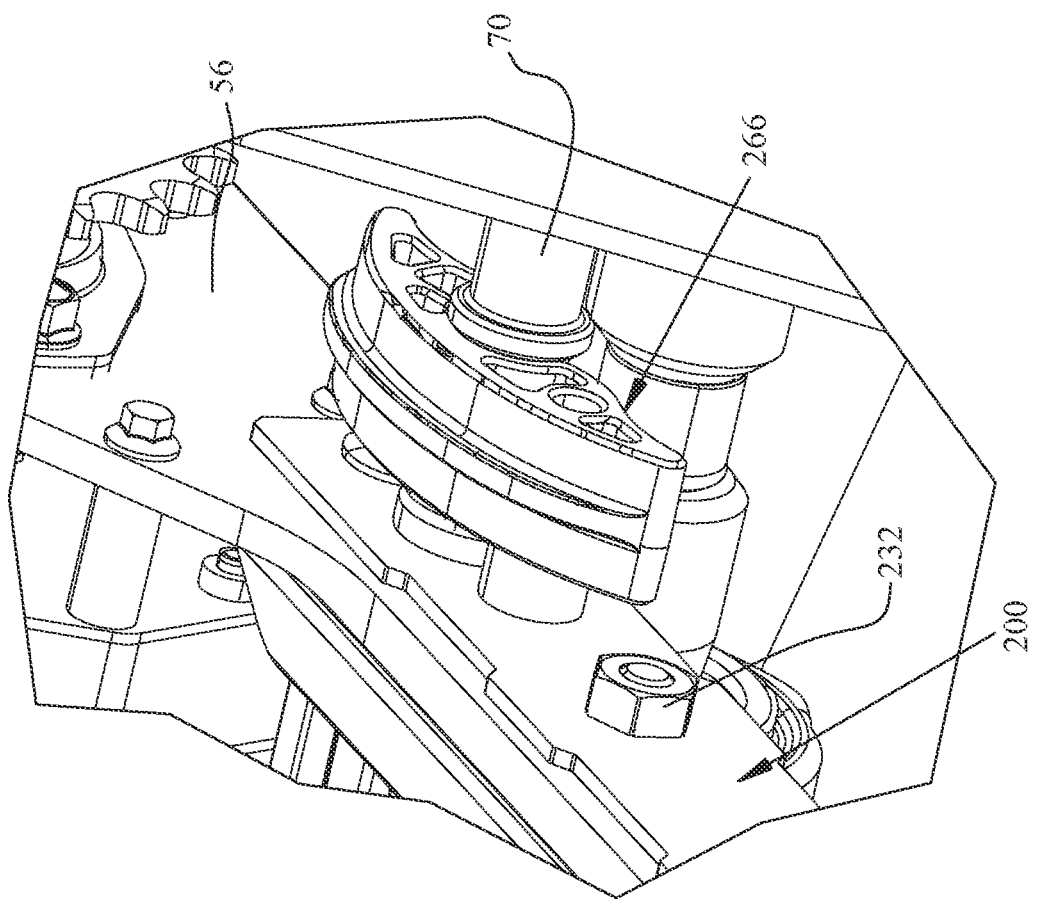
FIG. 21 shows an enlarged perspective view of the chain guide without the chain.
Figure 22:
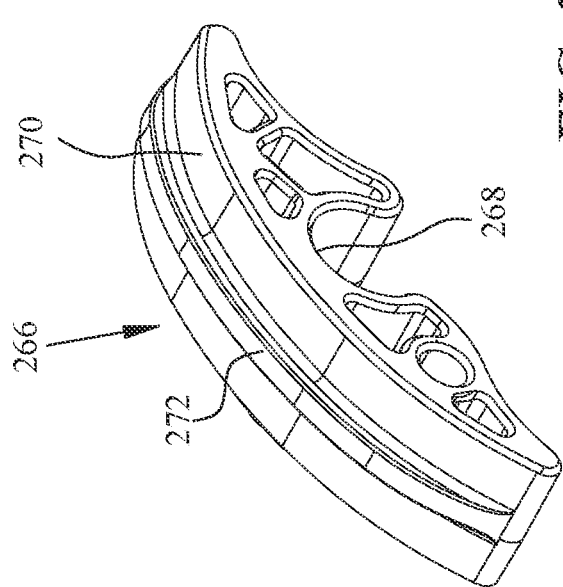
FIG. 22 shows an enlarged perspective view of the chain guide.

With reference now to FIGS. 19 and 20 the routing of the chain drive will be described in greater detail. As shown best in FIG. 19, spine 56 includes a raised portion 250 which allows mounting of flange 252 which in turn mounts a propulsio driven member, such as a sprocket 254, thereto. Sprocket 254 receives power from the motor bike from a propulsion drive member, such as an output sprocket 256 (see FIG. 20). As shown best in FIG. 20, a linear element 260 in the form of a chain is routed around sprocket 254 driven by sprocket 256 and positioned over a top of chain guide 266. As shown best in FIG. 22, chain guide 266 includes a U-shaped aperture 268 such that chain guide 266 is received over spacer 70. Chain guide 266 further includes an arcuate surface 270 having a central rib 272 extending therealong. As shown best in FIGS. 5 and 13, a second chain guide 274 is positioned on the left hand side yoke arm 182, and has a rib 276 which aligns with rib 272 for contacting the chain 260. Thus, rib 272 can be positioned intermediate chain links to guide the chain up and away from the belt 36 as shown best in FIG. 20. As shown in FIG. 20, chain guide is positioned on the outside of chain 260 pushing chain 260 upwardly towards the upper length of the chain 260. As shown best in FIGS. 19 and 23, sprocket 254 drives chain transfer case 44 which in turn drives sprockets 280 through shaft 282. Belt 36 is entrained around sprockets 280, slide rails 24 (FIG. 19), idler rolls 284 and idler rollers 286 (FIG. 1).

As shown best in FIGS. 17A and 18, a shock absorber 300 is shown having a body portion 302, an upper coupling 304 and a lower coupling 306. As shown best in FIG. 17A, shock 300 is coupled within well 162 by way lower coupling 306. Lower coupling 306 includes adjustment linkage 310 having threaded rod 312 and transverse rod 314. Threaded rod 312 includes a jam nut 315, such that the length of shock 300 can be adjusted by loosening jam nut 315 and threading rod 312 into or out of the body portion 302. As best shown in FIG. 17A, transverse rod 314 has apertures 316 which align with apertures 166, for receiving a fastener such as a bolt therethrough for retaining the lower coupling 306 within the forged coupler 42.

Figure 24:
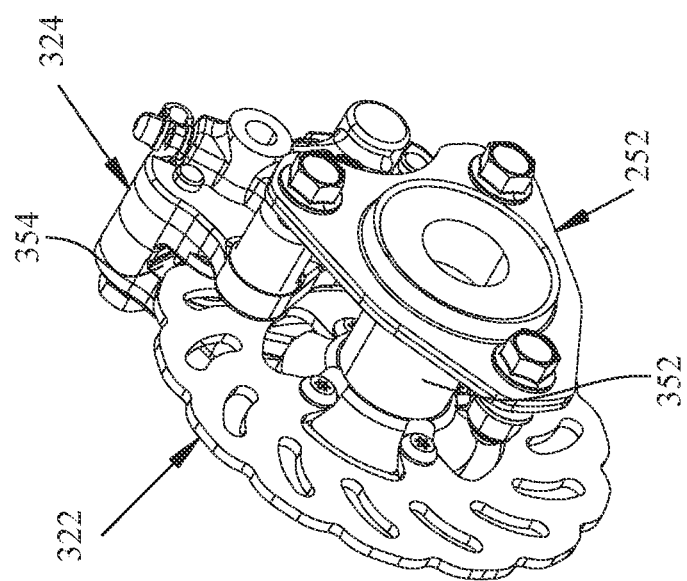
FIG. 24 shows an enlarged perspective view of the brake without the outer casing.
Figure 25:
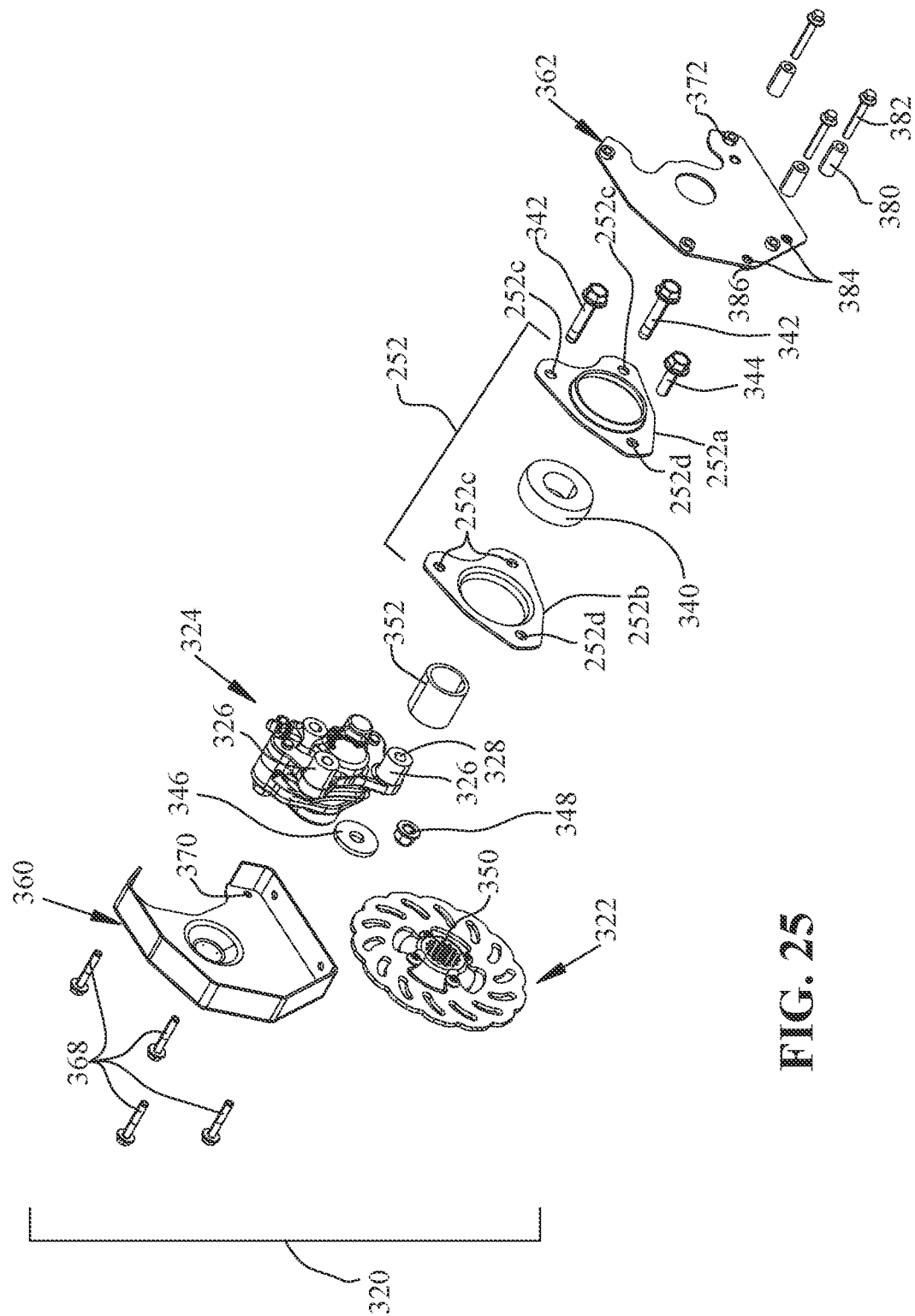
FIG. 25 shows an exploded view of the brake assembly.

With reference now to FIGS. 23-25, brake assembly 320 will be described in greater detail. As mentioned before, flange 252 is mounted to a portion 250 of spine 56 which mounts sprocket 254 thereto. Sprocket 254 is coupled to a shaft 321 (shown in phantom in FIG. 23) which operates a sprocket (not shown) within transfer case 44, but is also coupled to a brake disk 322 (FIG. 25) of brake assembly 320. As shown best in FIG. 25, brake assembly 320 includes a caliper 324 having posts 326 with threaded apertures 328. Flange 252 includes an outer flange portion 252a and an inner flange portion 252b where the flange portions 252a, 252b include apertures 252c. Flange portions 252a and 252b also include apertures 252d. A bearing 340 is positioned between the flanged portions 352a and 352b. Fasteners 342 may be positioned through apertures 252c and received into threaded posts 326; and fastener 344 may be positioned through apertures 252d, trapping portion 250 of spine 56 therebetween (FIG. 23). A washer 346 and fastener 348 are positioned on the backside of spine 56 and couple to faster 344.

It should be understood that shaft 321 also extends through flange 252 and into splined portion 350 of brake disc 322. A spacer 352 is positioned between bearing 340 and splined portion 350 and extends over shaft 321. As shown best in FIG. 24, disk 322 is positioned in a slot 354 of caliper 324, and disk pads (not shown) contact disc 322 for braking purposes. As also shown in FIG. 25, a cover surrounds brake disk 322 and includes a cover portion 360 and cover portion 362. Cover portion 360 is coupled to cover portion 362 by way of fasteners 368 extending through apertures 370 of cover portion 360 and into threaded engagement with threaded bosses 372 on cover portion 362. Cover portions 360 and 362 are coupled to spine 56 by way of spacers 380 (see FIGS. 23 and 25) and fasteners 382 extending through apertures 384 and coupled to threaded bosses 386 (FIG. 25) on the back side of cover 372 to couple to spine 56.

Figure 27:
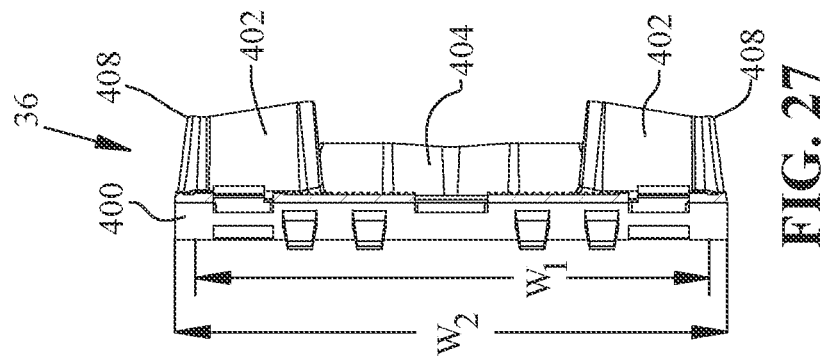
FIG. 27 shows a cross-sectional view through lines 27-27 of FIG. 26.
Figure 26:
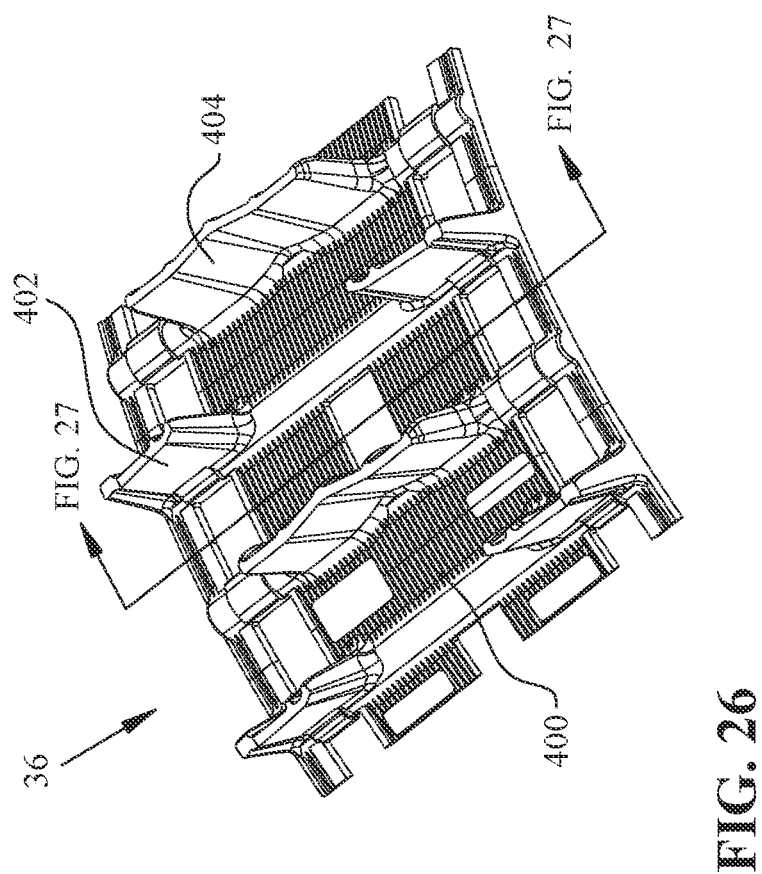
FIG. 26 shows a front left perspective view of a portion of the drive belt.

With reference now to FIGS. 26 and 27, belt 36 will be described in greater detail. As shown in FIG. 26, belt 36 includes a belt body portion 400 having outer track lugs 402 and inner lugs 404. As shown best in FIG. 27, the distance between an outer edge 408 of the lugs 402 has a width $W_1$, and the outer width of track body 400 has a width $W_2$. In the embodiment shown, $W_2$=11.5" and $W_1$=11.25" although $W_2$ could be 10.75". Thus, a ratio of $W_1/W_2$ has a value of 1.022 and is in the range of 1.0-1.070.

With reference now to FIGS. 28 and 29, a front ski assembly is shown at 450, including a spindle portion 452 couple to a ski 454. Ski 454 is substantially similar to that shown in our US patent application publication number 2015/0259032, incorporated herein by reference. As shown, a distance between side edges 460 of ski 454 is $W_3$. In the embodiment shown, $W_3$ is equal to or greater than $W_2$ (width of belt as shown in FIG. 27), such that ski 454 flattens the snow for the track belt 36. In the embodiment shown, the width of the ski is 11.5". Thus the ratio $W_3/W_2$ is 1 to 1, but the ratio of $W_3/W_2$ has a range between 1 to 1 and 1.5 to 1 (11.5"-17.25" ski), and is preferably in the range 1 to 1 and 1.3 to 1 (11.5"-14.95" ski) and more preferably in the range of 1 to 1 and 1.2 to 1 (11.5"-13.8" ski).

As shown in FIGS. 9 and 19, the width of the chain transfer case 44 is very narrow as compared to other previously known snow bikes. This prevents the transfer case 44 from dragging through the snow, causing a drag on the snow bike. As shown in FIG. 9, the nominal width of the frame 40 is $W_4$ and the total width of the rear suspension including the transfer case is $W_5$. In the embodiment shown, $W_4$=12.375" and $W_5$=13.8125". The ratio of the total width to the frame 40 is $W_5/W_4$ and in the embodiment shown is 1.116 and has a range of 1.0-1.25, and is preferably is in the range 1.10-1.2.

Also, as the mounting of the sprocket 254 is high in the frame 40, see FIG. 19, the air box in the motor bike need not be moved which provides ease of installation. Furthermore, since shock 300 is coupled to the forged coupler 42, rather than to the rear frame 40, the position and angle of the shock 300 never changes, even when the chain tensioning device 50 is used.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A rear suspension for a snow vehicle having a vehicle frame and a propulsion drive member for driving the belt, the rear suspension, comprising:
   a rear suspension frame;
   a drive belt coupled to the rear suspension frame;
   a propulsion driven member supported by the rear suspension frame;
   a linear element coupling the propulsion drive member and the propulsion driven member to drive the drive belt;
   a coupler for mounting to the rear suspension frame and for coupling the rear suspension frame to the vehicle frame;
   a fastening assembly for fixing the coupler relative to the rear suspension frame; and
   a linear assist member for assisting the movement of the coupler relative to the rear suspension, whereby when the coupler is fixed relative to the rear suspension frame, the propulsion drive member and propulsion driven member are fixed relative to each other, and when the fastening assembly allows relative movement of the rear suspension frame and the vehicle frame, the linear assist member may be activated to move the propulsion drive member and propulsion driven member relative to each other, to tighten the linear element.

2. The snow vehicle of claim 1, wherein the linear assist member is a jack bolt coupled to either the coupler or the rear suspension frame.

3. The snow vehicle of claim 2, wherein the jack bolt is coupled to a rear portion of the coupler and moves rearwardly to contact a portion of the rear suspension frame to effect the linear movement.

4. The snow vehicle of claim 3, wherein the rear portion of the coupler is curved inwardly and forwardly to provide a spacing between the coupler and the rear suspension frame portion.

5. The snow vehicle of claim 3, wherein a lock nut is positioned on the jackscrew and is movable against the coupler to fix the jack bolt relative to the coupler.

6. The snow vehicle of claim 3, wherein the coupler is forged and includes a rear wall having a threaded aperture which receives the jack bolt.

7. The snow vehicle of claim 1, wherein the coupler has a base portion which is generally rectangular in shape, and a front portion of the rear suspension frame at least partially encompass the rectangular base portion.

8. The snow vehicle of claim 7, wherein the front portion comprises opposing channel portions which receive the rectangular base portion.

9. The snow vehicle of claim 8, wherein the fastening assembly comprises at least one fastener extending through the opposing channel members and the coupler.

10. The rear suspension of claim 9, wherein one of the opposing channel members or coupler include a slotted aperture through which the fastener extends.

11. The rear suspension of claim 10, wherein the coupler includes a front and rear slotted aperture through which front and rear fasteners extend.

12. The rear suspension of claim 1, wherein the linear element is a chain and the propulsion driven member is a sprocket.

* * * * *